(12) United States Patent
McCrory et al.

(10) Patent No.: US 7,309,205 B2
(45) Date of Patent: Dec. 18, 2007

(54) VEHICLE LOADING AND UNLOADING METHOD

(75) Inventors: Kevin Richard McCrory, Chilliwack (CA); Gary Wayne Teichrob, Chilliwack (CA); Todd Mendenhall, Riverton, UT (US); Fred P. Smith, Alpine, UT (US)

(73) Assignee: TY-Crop Manufacturing Ltd., Rosedale (CA)

( * ) Notice: Subject to any disclaimer, the term of this patent is extended or adjusted under 35 U.S.C. 154(b) by 108 days.

(21) Appl. No.: 10/900,548

(22) Filed: Jul. 28, 2004

(65) Prior Publication Data

US 2005/0111941 A1   May 26, 2005

Related U.S. Application Data

(63) Continuation-in-part of application No. 10/720,301, filed on Nov. 24, 2003, now Pat. No. 7,114,909.

(51) Int. Cl.
*B65G 67/02*     (2006.01)
*B65G 67/42*     (2006.01)

(52) U.S. Cl. .............. 414/809; 414/369; 414/372; 414/371

(58) Field of Classification Search .............. 414/357, 414/359, 360, 362–367, 369, 371–372, 382, 414/809; 298/17 T, 18; 292/DIG. 32, 57–59
See application file for complete search history.

(56) References Cited

U.S. PATENT DOCUMENTS

| | | | | |
|---|---|---|---|---|
| 258,997 A | * | 6/1882 | Crandal | .............. 248/503.1 |
| 327,506 A | * | 9/1885 | Wolcott | ................... 414/360 |
| 410,807 A | * | 9/1889 | Ruffhead | .................. 292/58 |
| 549,924 A | * | 11/1895 | Brown | ....................... 292/58 |
| 615,554 A | * | 12/1898 | Hogan | ....................... 414/359 |
| 704,014 A | * | 7/1902 | Espitallier | ................. 292/58 |
| 948,038 A | * | 2/1910 | Bradley | ..................... 414/369 |
| 1,237,099 A | * | 8/1917 | Rogers | ...................... 414/372 |
| 1,322,499 A | * | 11/1919 | Mathews | ..................... 292/58 |
| 2,205,845 A | * | 6/1940 | Cochran | ..................... 114/117 |
| 4,081,191 A | * | 3/1978 | Capozello | ................... 292/197 |
| 5,080,548 A | | 1/1992 | Bratlie et al. | |
| 5,344,271 A | | 9/1994 | Bratlie et al. | |
| 5,509,723 A | | 4/1996 | Bratlie | |
| 6,019,568 A | | 2/2000 | Bratlie | |
| 6,402,451 B1 | | 6/2002 | Brown | |
| 6,572,197 B1 | * | 6/2003 | Clough | .................... 298/23 B |

FOREIGN PATENT DOCUMENTS

GB   2152448 A   *   8/1985

* cited by examiner

*Primary Examiner*—Saul Rodriguez
*Assistant Examiner*—Charles Greenhut
(74) *Attorney, Agent, or Firm*—Pate Pierce & Baird

(57) ABSTRACT

A trailer unloading system anchors one or more trailers to a deck, with, or without tractor attached. The sides of the trailers are free to pivot from a top, longitudinal, pivot axis once unlatched from the edge of the trailer floor. The deck tilts the trailers sideways, the doors swing free, and the load discharges. The deck returns to level, the sides latch to support the floor and the trailers are ready to be reloaded.

8 Claims, 28 Drawing Sheets

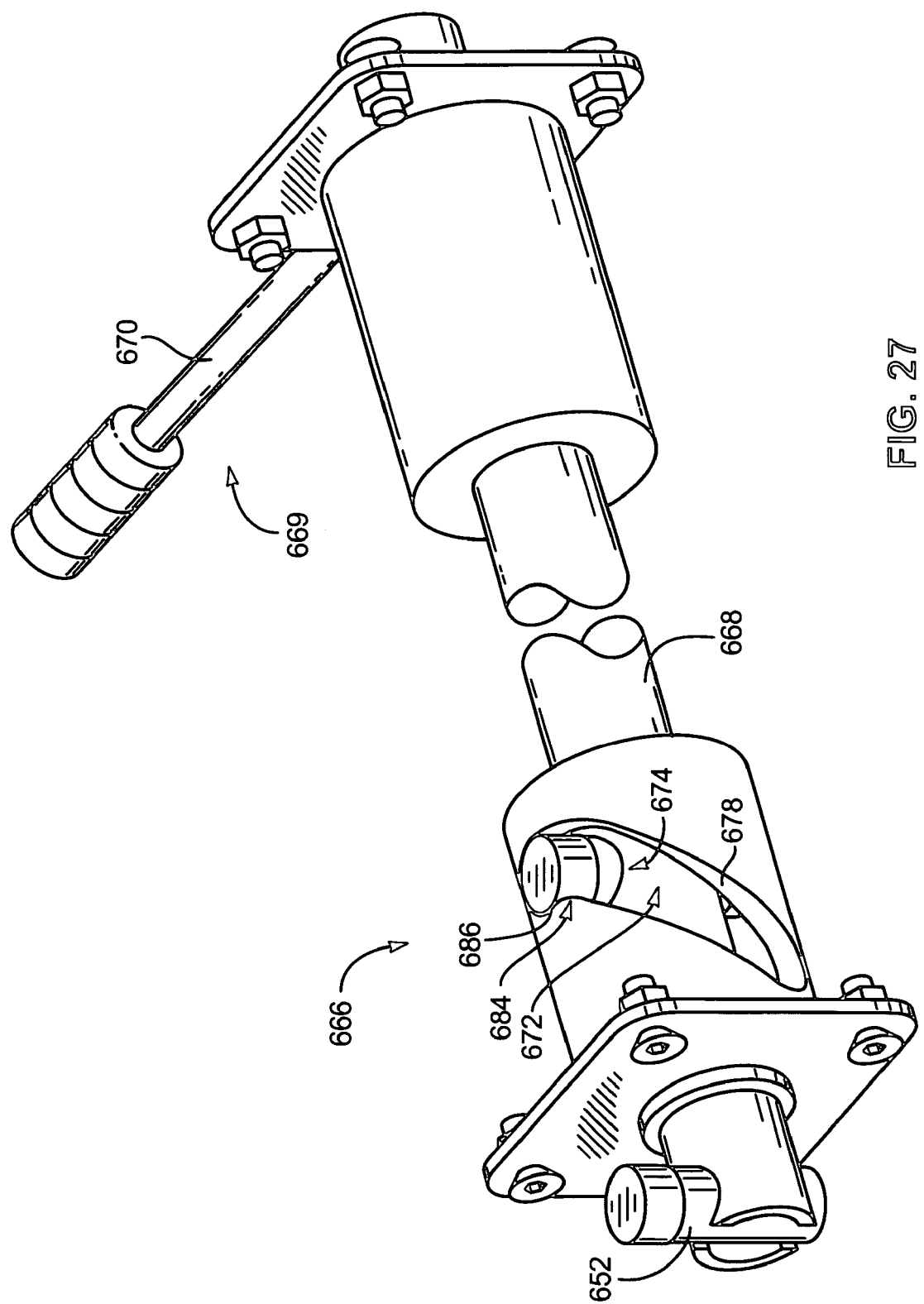

VEHICLE LOADING AND UNLOADING METHOD

RELATED APPLICATIONS

This patent application is a continuation-in-part of U.S. patent application Ser. No. 10/720,301 filed Nov. 24, 2003 now U.S. Pat. No. 7,114,909 and entitled TRAILER-TILTING LOAD DISCHARGE APPARATUS AND METHOD.

BACKGROUND

1. The Field of the Invention

This invention relates generally to the field of trailer dumping systems. More particularly this invention relates to an apparatus that tips or rotates trailers to unload their contents.

2. The Background Art

Trucks frequently carry cargo comprising comparatively small loose particles such as coal, gravel, or hog fuel (large sections of tree bark burned for heating purposes). Various mechanisms exist to unload such cargo. For example the underside of a vehicle may have a trapdoor that is opened to release the cargo. Such a system requires either that a receiving structure be positioned directly beneath the trapdoor or that the cargo be released while the vehicle is in motion to avoid dragging the wheel assembly through large mounds of material.

Such systems have significant disadvantages for cargo that is not comparatively dense. For such cargos, a unitary or trailing vehicle's volume must be maximized in order to approach the weight bearing capacity of the frame and engine or of a towing vehicle. Providing a trapdoor and an actuator to open and close a trapdoor on the underside of a vehicle takes clear, unsupported space and necessitates larger structural members to compensate for the weakness created by the opening. Furthermore, the size of a trapdoor must necessarily be limited to avoid structural weakness. Therefore, bulky and irregular cargos will be likely to jam when unloading.

Other systems provide an opening on top of a vehicle and unload cargo by rotating the entire vehicle such that the cargo falls out the top. However, such systems require a great deal of time and energy to lift and rotate the vehicle through an angle of 140 degrees or more.

Still other systems provide doors at the rear of a vehicle and unload the vehicle by raising the front of the vehicle relative to the rear so that the cargo flows out the rear doors. Such systems have the disadvantage of requiring a great deal of space, energy, and power to lift the center of gravity of the vehicle to a sufficient height for the contents of the vehicle to flow out. Furthermore, the size of the opening at the rear of the vehicle is typically limited to the width of the vehicle. Where the cargo is bulky and irregularly shaped, such an opening may cause the cargo to bridge or otherwise jam during unloading.

Thus it would be an advancement in the art to provide a system that allows for unloading of bulky, irregularly shaped cargos, such as debris, long objects, and so forth. Such a system would provide a large, clear, unobstructed opening that would not require excessive lifting or tilting of the vehicle to unload the cargo. It would be a further advancement in the art to provide a large opening of substantially the dimension of the cargo hold, facilitating unloading while preserving the structural integrity of the vehicle.

BRIEF SUMMARY OF THE INVENTION

An invention is disclosed in sufficient detail to enable one of ordinary skill in the art to make and use the invention. An unloading station may be sized to receive a truck and one or more trailers. The unloading station may be actuated hydraulically, or otherwise, to tip the truck and trailers, rotating them about a longitudinal axis. The trailers may have side mounted doors hinged at the top of the trailers. Upon tipping, the contents of the trailers empties under the force of gravity. An anchoring system may maintain the truck and trailers in a stable position during tipping. In some embodiments, hydraulically tensioned chains may secure to the side of the trailers opposite the side mounted doors.

Bulky lower support members, especially under a cargo hold, may limit the ability of a trailer to both hold large volumes of cargo and unload cleanly. Accordingly, lower support members may have diminished size and be supported by the doors when the doors are closed and locked into place. During unloading, the doors must open. Therefore, an external support mounted to the unloading station is brought up to support the lower support members of the trailers. In some embodiments a series of plates pivotally mounted on a cross beam may be lifted hydraulically into a position, e.g. with the plates extending horizontally initially, supporting the lower support members. Mounting the plates pivotally may permit them to both rest flat on the unloading station while the trailers are driven onto an unloading station and to seat properly on the lower support members when raised.

The doors may latch by lifting upwardly such that catches positioned on the lower edge of the door (e.g. side-opening door) are brought into engagement with receptacles on the lower support members (e.g. under the cargo hold floor) of the trailer. Such a configuration allows the door to act as a shear plate and a lift exerting an upward force on the lower support members. An actuated latching system may lift the door hydraulically or otherwise and lock the door in position. In some embodiments, the latching system may be a linkage having an over-center position, e.g. effectively a four-bar linkage, for example, (e.g. breaking over-center into a stable position). The latching system may be moved to the over-center position to effectively lock the door in a closed position without the need for constant application of force to the linkage.

Due to the nature of the bending forces in the loaded trailers, the net force on lower support members near either end of the trailers may be upward. Accordingly, the doors may latch in a manner allowing the doors to exert a net downward force on the lower support members. Pins, or like structures may be inserted, or extended from the lower support members such that the pins, or the like, are positioned just below the lower edge of the door in a position to exert an upward force on the door. In some embodiments, the pins may be hydraulically extended from and retracted through the lower support members.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 27 is a partial cutaway view of the locking mechanism of FIG. 23 in accordance with the invention;

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 22, is not intended to limit the scope of the invention. The scope of the invention is as broad as claimed herein. The illustrations are merely representative of certain, presently contemplated embodiments of the invention. Those embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
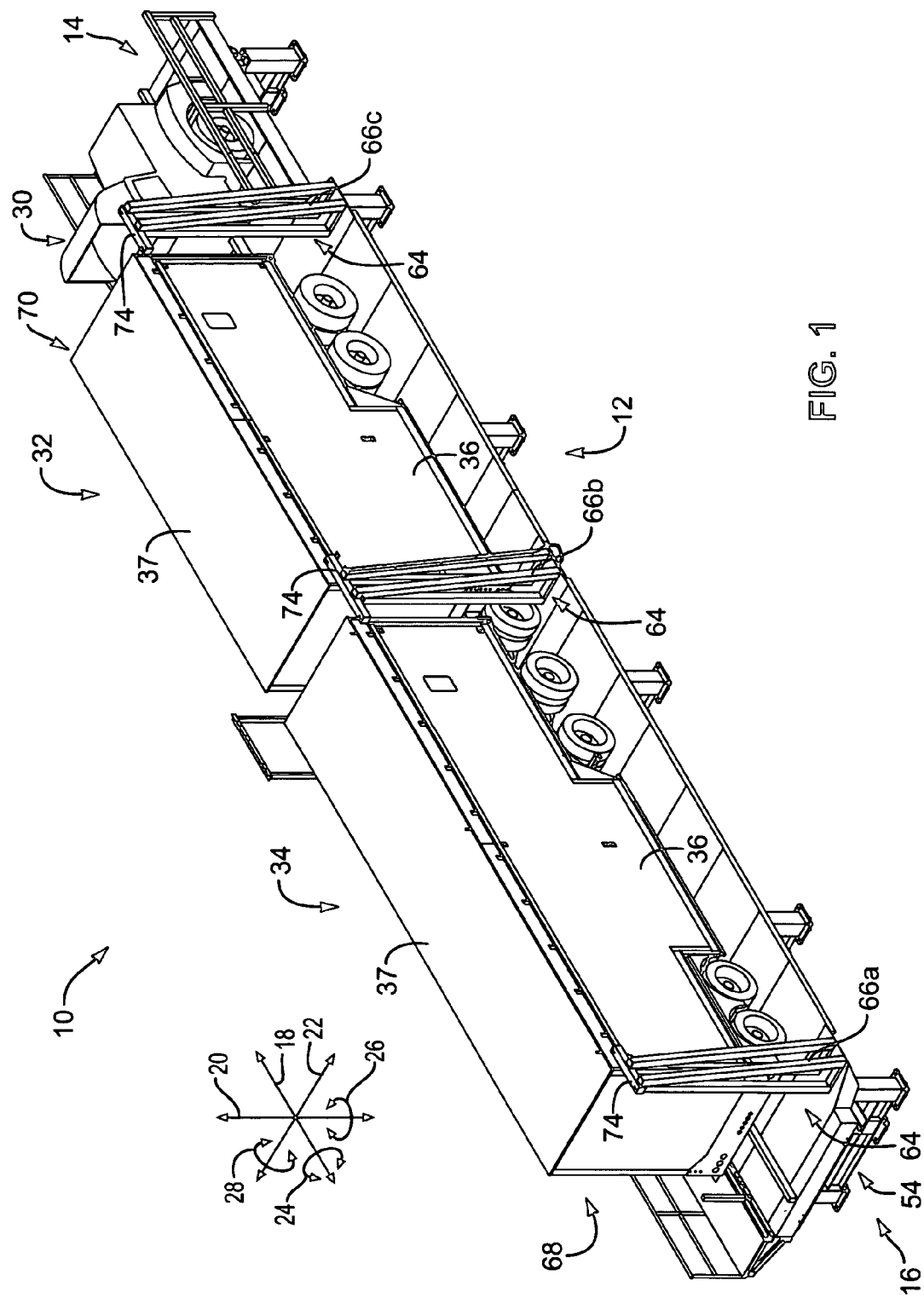
FIG. 1 is a perspective view of an unloading station and side-dumping trailers in accordance with the invention.
Figure 2:
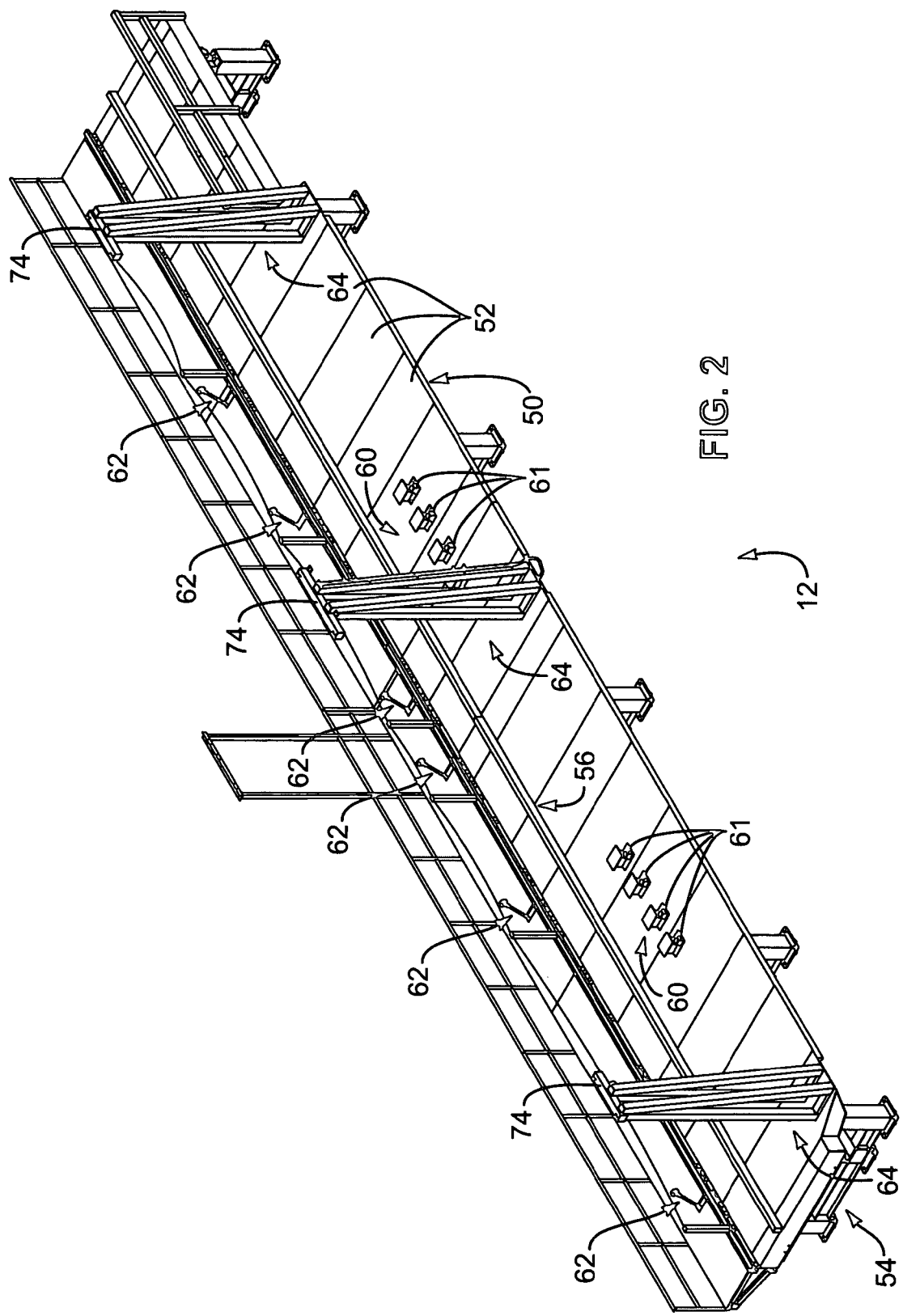
FIG. 2 is a perspective view of an unloading station in accordance with the invention.

Referring to FIGS. 1 and 2, in one embodiment an apparatus 10 may include an unloading station 12 having a forward end 14 and a rearward end 16. A longitudinal direction 18 may be defined as substantially parallel to a line connecting the forward end 14 and the rearward end 16. A transverse direction 20 may be defined as substantially parallel to the line of action of gravitational forces when the unloading station 12 is not tipped. A lateral direction 22 may be defined as substantially perpendicular to the longitudinal direction 18 and the vertical direction 20. Rotational directions 24, 26, 28 may be defined as rotation about any axis parallel to the longitudinal direction 18, vertical direction 20, and lateral direction 22, respectively.

A truck 30 may tow a lead trailer 32. A truck 30 may also tow a pup trailer 34 secured to the lead trailer 32. The truck 30 and trailers 32, 34 may be positioned on the unloading station 12. The truck 30 and trailers 32, 34 may be driven onto the unloading station 12, hoisted onto the unloading station 12, or otherwise positioned on the unloading station 12.

The unloading station may then be actuated to unload the trailers 32, 34. In some embodiments, the truck 30 or tractor 30 may be positioned on the unloading station 12 during unloading. In others, the truck 30 may simply draw the trailers 32, 34 onto the unloading station 12, detach from the trailers 32, 34, and drive off the unloading station 12. In still other embodiments, the trailers 32, 34 may be detached from the truck 30 and hoisted or towed onto the unloading station 12. The trailers 32, 34 may have doors 36 to facilitate unloading.

The tops 37 of the trailers 32, 34 are typically removable and may be embodied as tarps or like structures for preventing the cargo from escaping. The tops 37 are typically removed to facilitate loading of the trailers 32, 34 from above.

Referring to FIGS. 1 and 2, an unloading station 12 may have a bearing surface 50 sized to support the a trailer 32, trailers 32, 34, or truck 30 and trailers 32, 34. The bearing surface 50 may be made of steel or other sufficiently strong structural material. In some embodiments the bearing surface 50 is a sheet 52, or sheets 52 of steel. The sheet 52 may be supported by undergirding members 54 or the like to increase its stiffness. A wheel guide 56 may positioned on or near the bearing surface 50 and may resist sliding of the wheels of the trailers 32, 34 or truck 30 in the lateral direction 22.

In some embodiments of the present invention, the doors 36 may provide structural strength to trailers 32, 34 when closed. Accordingly, an unloading station 12 may include an external support to relieve stresses in the trailers 32, 34 when the doors 36 are opened during unloading. In embodiments of loading stations 12 simultaneously accommodating both trailers 32, 34, multiple external supports may be provided to independently support each trailer 32, 34.

In some embodiments, the external supports are belly supports 60 positioned to support the underside of a trailer 32, 34. The belly support 60 may be hydraulically actuated such that it may be positioned flush with the sheet 52 while the trailers 32, 34 are drawn onto the loading station 12, and then raised to support the trailers 32, 34 during unloading. The belly support 60 may extend through apertures 61 in the sheets 52.

The unloading station 12 may be actuated to unload the trailers 32, 34 by rotating the bearing surface 50 in a rotational direction 24. Accordingly various anchoring mechanisms may be used to prevent trailers 32, 34 from falling or dislodging during rotation. Anchors 62 may therefore engage the trailers 32, 34 and the truck 30 to prevent tipping or sliding relative to the bearing surface 50. In some embodiments, the anchors 62 may be positioned along one lateral side of the trailers 32, 34 opposite the doors 36. In some embodiments, the trailers 32, 34 may have doors 36 on both lateral sides, accordingly the position of the anchors 62 may be defined as being opposite the doors 36 that are opened for unloading purposes.

Referring to both FIGS. 1 and 2, fixed restraints 64 may prevent dislodgement or rollover of the trailers 32, 34 or truck 30 if the anchors 62 fail or are not engaged properly. The fixed restraints 64 are typically arranged such that no human intervention is required for their operation. For example, the fixed restraints 64 may be embodied as towers 66a-66c. The towers 66a-66c may be positioned such that they do not interfere with the opening of the doors 36.

Typical embodiments of the trailers 32, 34 have doors 36 extending along substantially the entire lateral side of the trailers 32, 34. Accordingly, a tower 66a may be positioned near the rearward end 68 of a pup trailer 34. A tower 66b may be positioned between the lead trailer 32 and the pup trailer 34. A tower 66c may be positioned near the forward end 70 of the lead trailer 32. A tower 66a-66c may have a cross member 74. The towers 66a-66c are typically sufficiently narrow such that an opening door 36 will not contact the towers 66a-66c or be obstructed thereby. The cross member 74 may extend in the longitudinal direction 18 such that the top of a tipping trailer 32, 34 would catch on the cross member 74. The cross members 74 are typically positioned vertically such that they do not interfere with opening doors 36. In some embodiments, a cable may be strung across the cross members 74 for added security. In still other embodiments, cable may be strung between the towers 66a-66c at a height providing security against falling for people working on the bearing surface 50.

Figure 3:
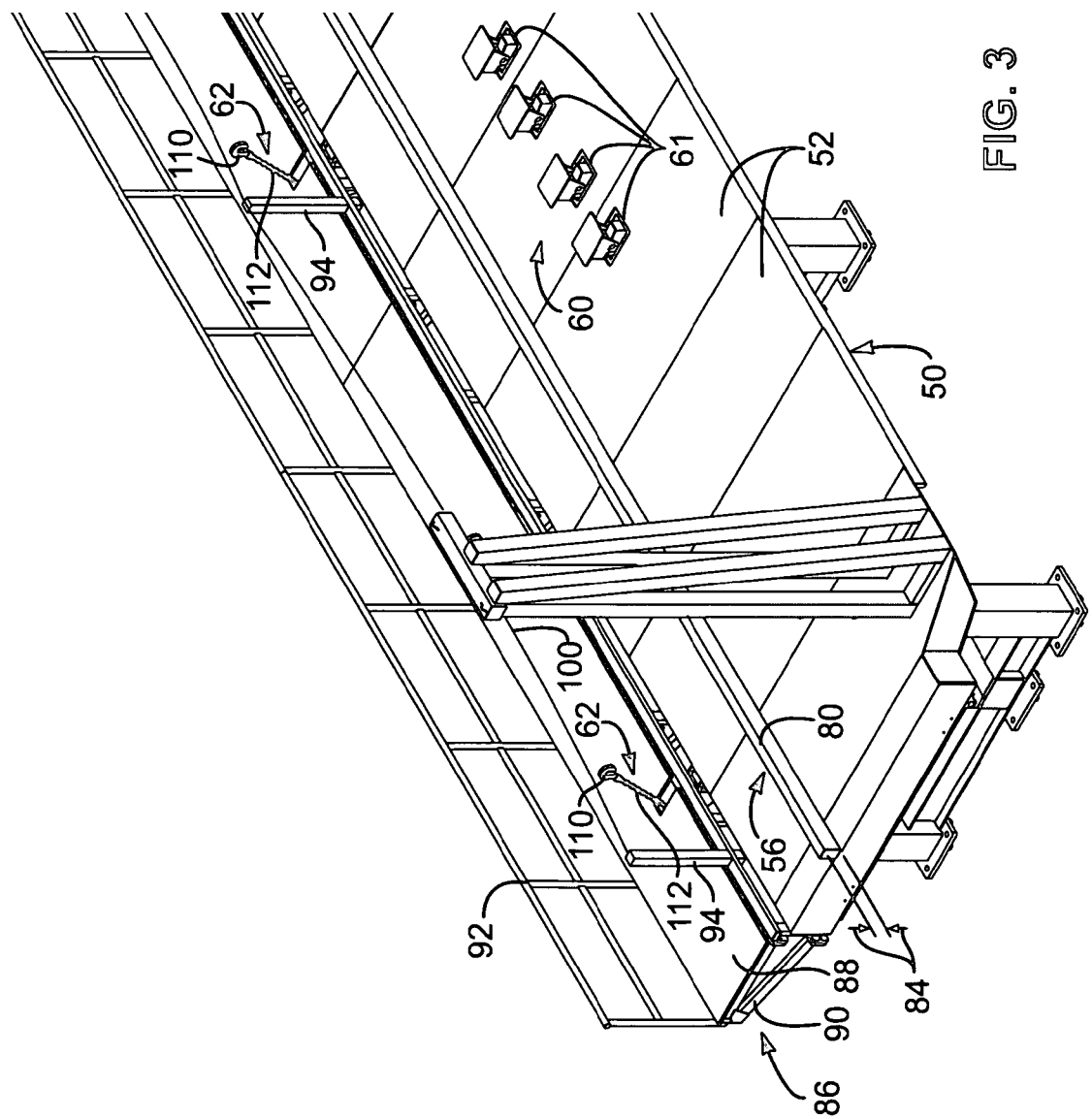
FIG. 3 is a partial perspective view of an unloading station in accordance with the invention.

Referring to FIG. 3, the wheel guide 56 may include a rail 80 secured to the bearing surface 50. In some embodiments the wheel guide 56 may include two rails 80 both positioned to resist motion of wheels in the same lateral direction 22. Thus, for example, one rail 80 may exert forces on an inward facing surface of a wheel on one side of a vehicle while another rail 80 exerts forces on the outside surface of a wheel on the other side of a vehicle. Alternatively, embodiments having two rails 80 may position the rails 80 such that each engages the inside surface of the wheels. In which case, one of the rails 80 serves to guide the truck 30 during positioning on the unloading station 12 and does not serve to restrain the truck 30 or trailers 32, 34 during unloading. The rail 80 may extend a sufficient distance 84 above the bearing surface 50 such that lateral forces may not readily cause a tire to deflect and slide over the rail 80. The larger the distance 84, the greater the extent to which a tire must deflect to slide over the rail 80.

A walkway 86 may secure to the side of the bearing surface 50. In some embodiments the walkway 86 may be a portion of the sheet 52 extending away from the anchors 62. In the illustrated embodiment, the walkway 86 comprises a separate sheet 88 supported by undergirding 90. Providing a separate walkway 86 having a separate sheet 88 and undergirding 90 may provide the significant advantage of requiring less massive structural members inasmuch as the walkway will only need to bear the weight of people walking thereon. Also, the span under the trailer need not be so extended. A walkway may include an outer railing 92 to prevent falls. Additional posts 94 may be provided between the walkway 86 and the bearing surface 50. The posts 94 may secure to a cable 100 or the like preventing operators from approaching to close to the trailers 32, 34 and truck 30 during the unloading process. Hooks, or the like, forming part of the anchor 62 may also hook to the cable 100 when not in use in order to present the anchoring hooks in a convenient position for subsequent use.

An anchor 62 maybe embodied as a fastener 110 secured to a line 112. The line 112 may have a length such that the fastener 110 need only secure to a trailer 32, 34 in order to adequately anchor the trailer 32, 34. Alternatively, the line 112 may secure to a tensioning system that tightens the chain during the unloading process. The line 112 may be embodied as a strap, cable, chain, cord, bar or any structure suitable for withstanding tensile forces.

Likewise, a fastener 110 may be embodied as any structure capable of securing one structure to another in a manner capable of resisting forces tending to separate them. Accordingly, the fastener 110 may be embodied as a hook, loop of material, or an eyebolt for fitting over a hook secured to a trailer 32, 34. The fastener 110 may alternatively be any structure sized to fit into a receptacle and resist movement in at least one direction after insertion, or any receptacle securable to a line 112 and capable of receiving another structure and resist removal thereof.

Figure 4:
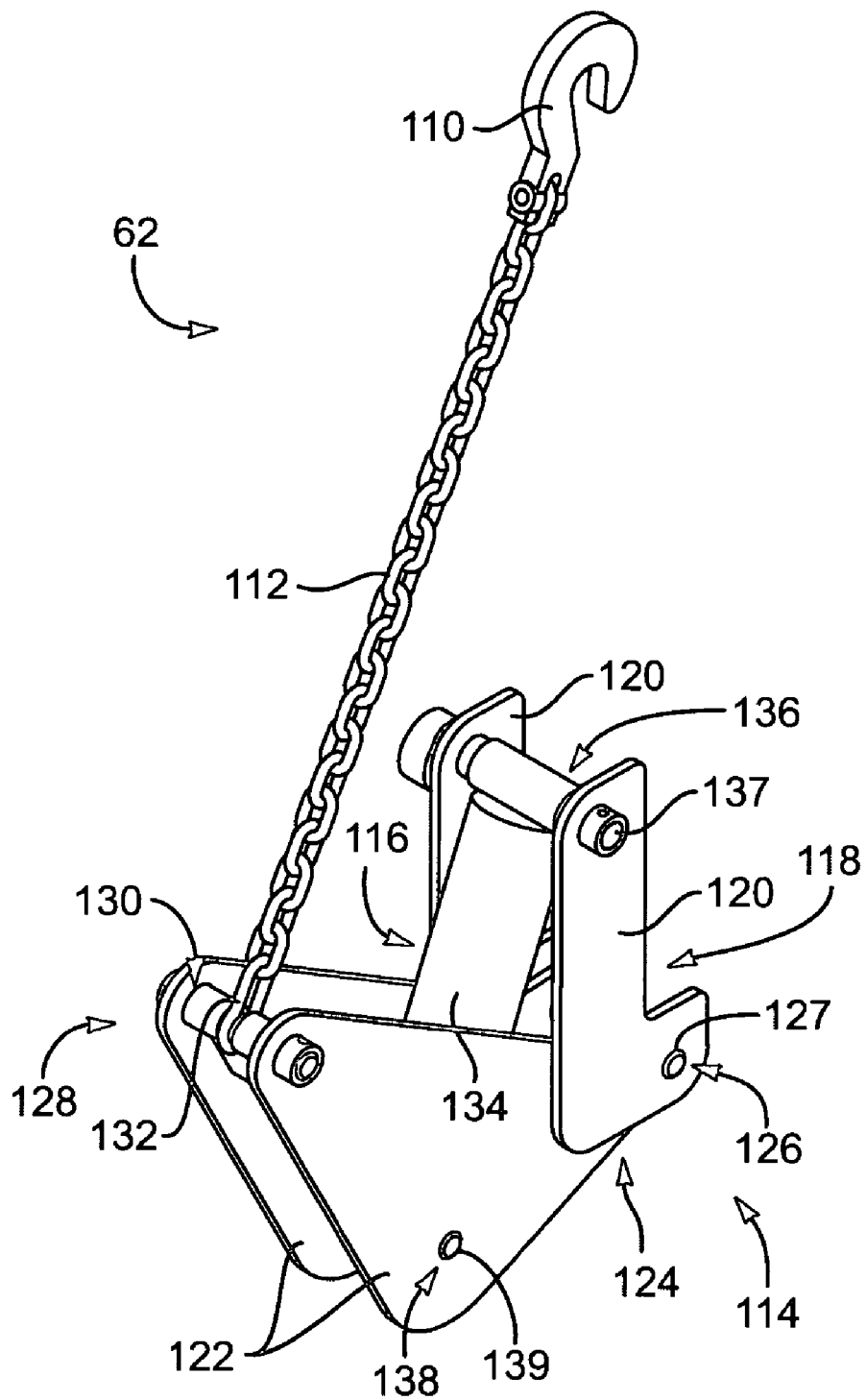
FIG. 4 is a perspective view of an anchor in accordance with the invention.

Referring to FIG. 4, a tensioning system 114 may include an actuator 116 that may be powered to provide tension and relieve tension in the chain 112. The actuator 116 may be any actuating system known in the art and capable of applying tension to a line 112. The actuator 116 may secure to a mounting bracket 118 secured to the undergirding 54. Alternatively, the mounting bracket 118 may mount directly on the sheet 52. In still other embodiments, the actuator may secure directly to the undergirding 54 or to the sheet 52. The mounting bracket 118 may include two side pieces 120 both secured to the undergirding 54 and spaced apart from one another. A lever arm 122 may secure to the mounting bracket 118. An end 124 of the lever arm 122 may secure to the mounting bracket 118 by means of a pivot 126, such as a bolt 127, rod 127, or other similarly performing structure.

Another end 128 of the lever arm 122 spaced apart from the end 124 may secure to the line 112 by means of a fastener 130, such as a bolt, weld, pin, or the like. In the illustrated embodiment, the fastener 130 may be a link 132 of the line 112 bolted to the lever arm 122.

The actuator 116 may be embodied as a cylinder 134, such as a hydraulic cylinder and piston 134, secured to the mounting bracket 118. The cylinder 134 may be mounted to the mounting bracket 118 by means of a pivot 136, such as a bolt 137, pin 137, rod 137, or the like. The piston of the hydraulic cylinder 134 sliding within the cylinder 134 may have one end secured to the lever arm 122. The piston of the hydraulic cylinder 134 may secure to the lever arm 122 by means of a pivot 138, such as a bolt 139, pin 139, rod 139, or the like. The point of attachment of the piston of the hydraulic cylinder 134 to the lever arm 122 may vary depending on the capacity of the piston and cylinder 134 to provide force and displacement in tensioning the line 112. The piston, and ram or rod associated therewith, of the hydraulic cylinder 134 may secure to the lever arm 122 at a position such that when the rod or ram extending from the piston head of the hydraulic cylinder 134 is at or below its maximum extension from the cylinder 134, the end 128 of the lever arm 122 has tensioned the line 112 enough to adequately anchor a trailer 32, 34.

Various equivalent embodiments of the tensioning system 114 described are possible, for example the cylinder 134 may secure to the lever arm 122 with the piston ram or of the cylinder 134 secured to the mounting bracket 118. In addition, a tensioning system 114 may simply have a line 112 coupled directly within an actuator 116 capable of tensioning the line 112.

In some embodiments, an agitator (e.g. vibrator, etc.) is interposed between the point of securement of the tensioning system 114 and the point of attachment of the fastener 110 to the trailer 32, 34. An agitator may shake loose the contents of a trailer 32, 34 and ensure that unloading occurs successfully. In alternative embodiments the agitator 140 is interposed between the fastener 110 and the line 112. Alternatively, the agitator may be interposed between the line 112 and the lever arm 122, between the piston 138 and the lever arm 122, or between the cylinder 134 and the mounting bracket 118.

Figure 5:
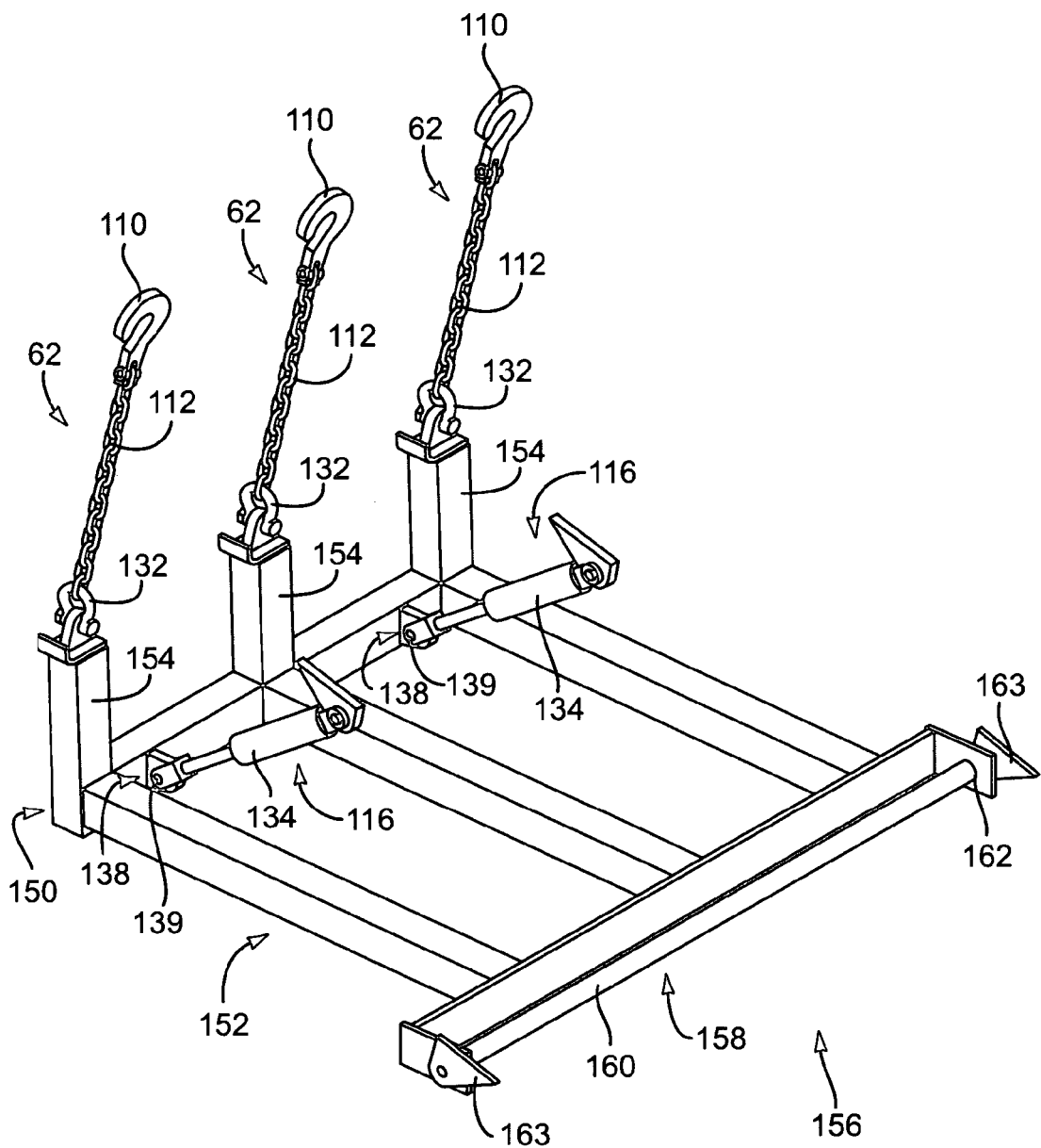
FIG. 5 is a perspective view of an alternative embodiment of an anchor in accordance with the invention.

Referring to FIG. 5, in some embodiments of a tensioning system 114, multiple anchors 62 may be tensioned by the same actuators 116. For example, the lines 112 of multiple anchors 62 may secure near the free end 150 of a frame 152. The lines 112 may secure to standoffs 154 extending upwardly from a point near the free end 150 of the frame 152 in order to position the lines 112 convenient for securement of the fasteners 110 to the trailers 32, 34.

A secured end 156 may secure to the undergirding 54, or the like, by means of a pivot 158. The pivot 158 may be embodied as a rod 160 passing through apertures 162 formed in the frame 152, with the ends of the rod 160 secured to flanges 163 secured to the undergirding 54, or other structure comprising the unloading station 12. One or more hydraulic cylinders 134 and pistons 138 may cause the frame to pivot about the pivot 158.

Figure 6:
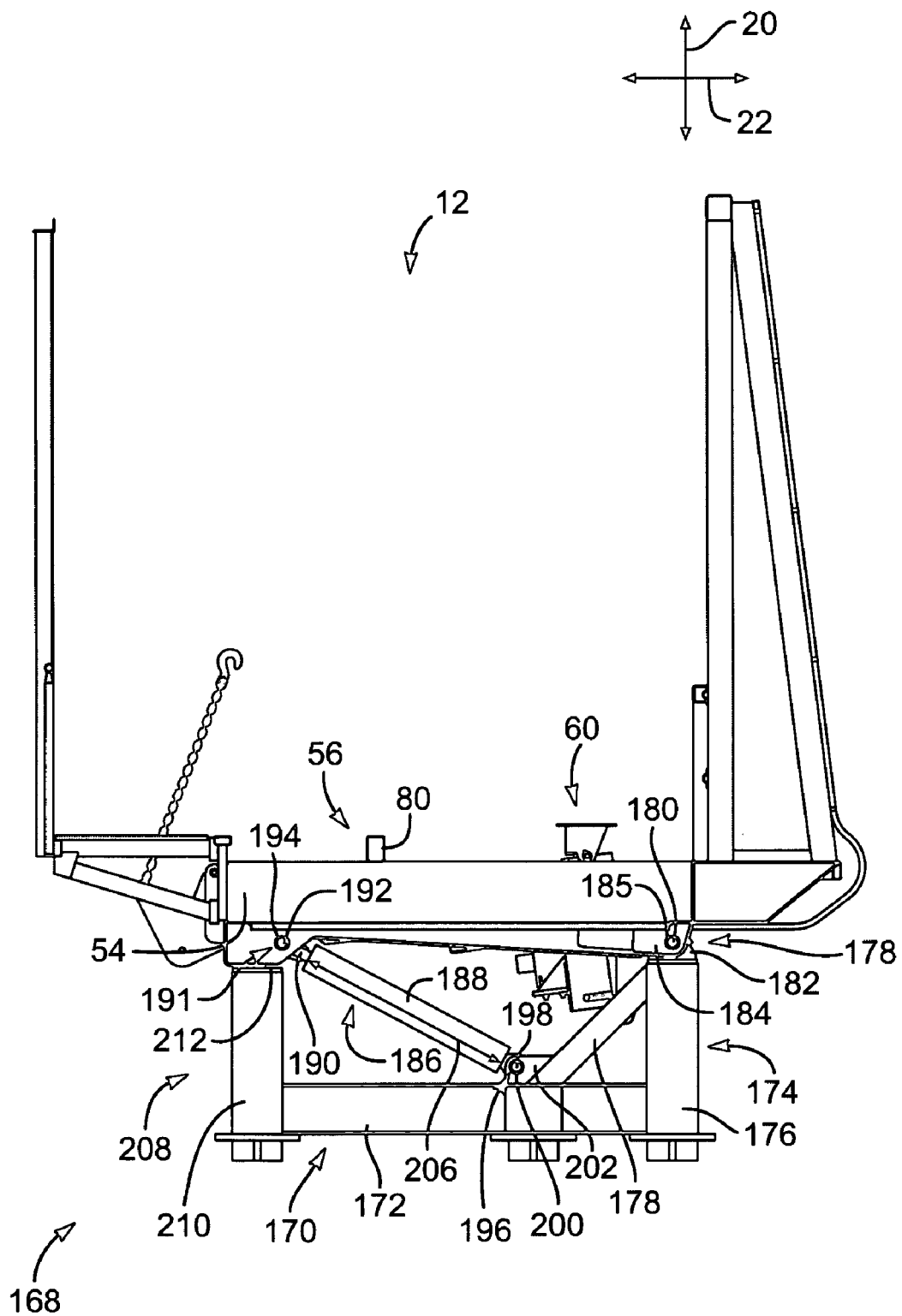
FIG. 6 is a side view of an unloading station in accordance with the invention.
Figure 7:
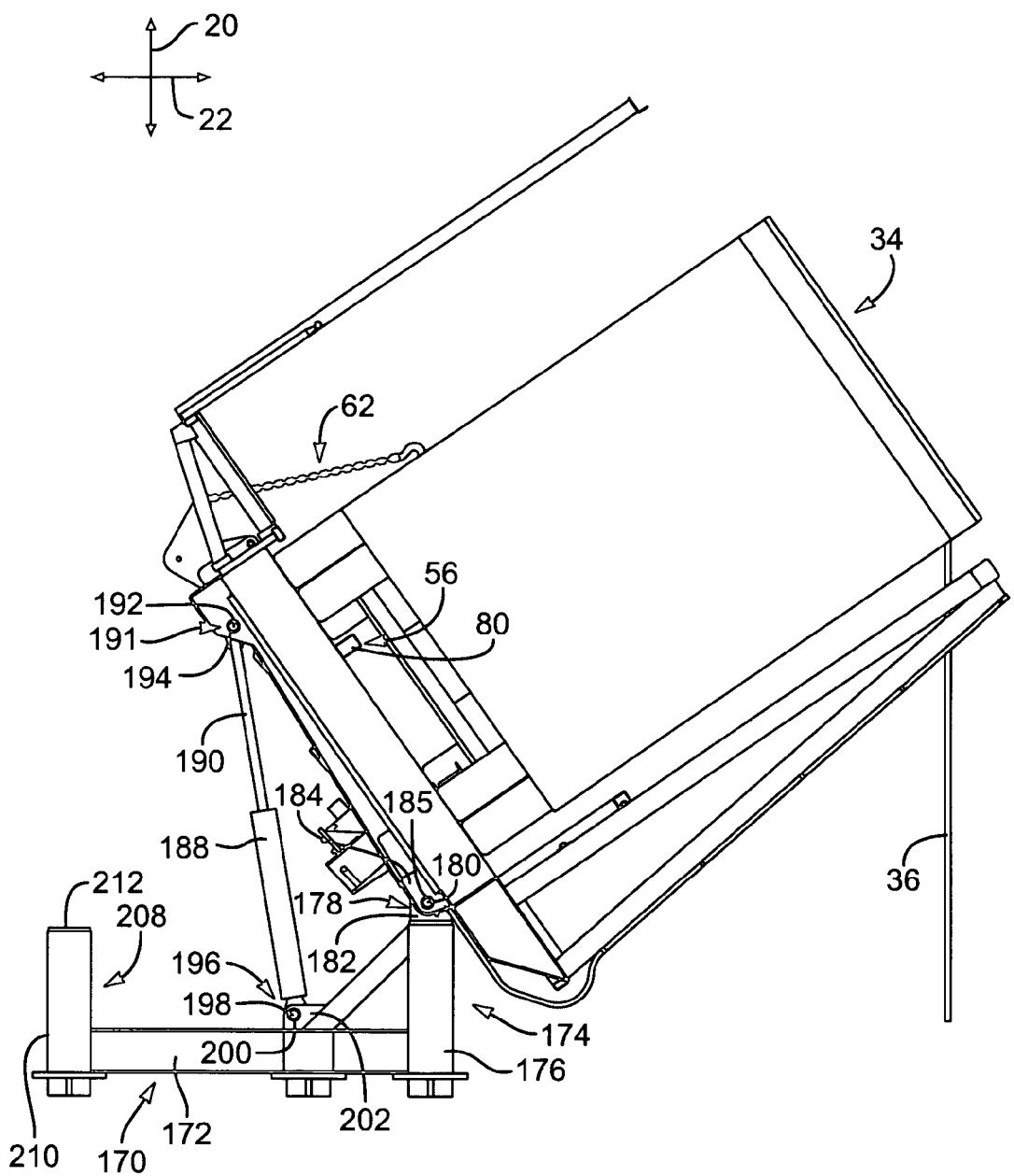
FIG. 7 is a side view of an unloading station and trailers in a tipped position in accordance with the invention.

Referring to FIG. 6, An unloading station 12 may include a plurality of support assemblies 168 spaced apart longitudinally along and beneath the bearing surface 50. A support assembly 168 may include a base 170 that may rest on a flat but otherwise unprepared surface, a specially prepared foundation, or on a trailer. The base 170 may secure to a foundation by means of bolts or the like. In embodiments resting on a trailer, the base 170 may secure to the bed of the trailer. The base 170 or trailer may include selectively positionable outriggers, such as might be provided for large trailer-mounted construction cranes, to provide stability during the unloading process. Likewise, ramps or the like may be provided to allow trailers 32, 34 to be raised from the ground to the bearing surface 50.

The base 170 may include beams 172 extending in the lateral direction 22. A vertical support 174 may secure to the beams 172 and extend upwardly therefrom. The vertical support 174 may raise the bearing surface 50 to provide a space for lifting hardware. A portion of the bearing surface 50 may pivotally secure to the vertical supports 174.

A vertical support 174 may be embodied as any suitable supporting structure. In the illustrated embodiment the vertical support 174 is a section of a square beam 176. A strut 177 may secure to the vertical support 174 and base 170 to reinforce the vertical support 174. Typically, the bearing surface 50 pivotally secures to the vertical supports 174 proximate an edge of the bearing surface 50. Accordingly, a pivot 178 may secure the vertical support 174 to the bearing surface 50. A pivot 178 may include any means known in the art for pivotally securing structural members.

In some embodiments, the pivot 178 may be embodied as a shaft 180 extending through apertures formed in both the vertical support 174 and the bearing surface 50. In some embodiments, the vertical support 174 may include a tongue 182 fitting into a groove 184 secured to the undergirding 54. A shaft 180 may then extend through apertures 185 extending through the tongue 182 and groove 184.

An unloading station 12 may include a lifting actuator 186 for tipping the bearing surface 50 and trailers 32, 34 resting thereon. It will be understood that although FIG. 6 illustrates one actuator 186, other actuators 186 may be distributed along the unloading station 12, spaced apart in the longitudinal direction 18 in a configuration substantially equivalent or even identical to that shown. Typically, each support assembly 168 will have an actuator 186 associated therewith. Furthermore, any mechanism or method known in the art for lifting and tipping, or both, may serve as an actuator 186 for tipping the bearing surface 50.

An actuator 186 may be embodied as a hydraulic cylinder 188 and piston 190. The piston 190 may secure near the edge of the bearing surface 50 opposite the point or location of attachment of the vertical support 174 to the bearing surface 50. The piston 190 typically pivotally secures to the bearing surface 50 by means of a pivot 191, such as a shaft 192 extending through an aperture 194 in the undergirding 54 of the bearing surface 50. The cylinder 188 may pivotally secure to the base 170 by means of a pivot 196, such as a shaft 198 extending through an aperture 200 in the base 170. Alternatively, flanges 202 may extend from the base and have the apertures 200 formed therein to receive a shaft 198.

In some embodiments, the cylinder 188 may have a length 206 such that when the piston 190 is withdrawn within the cylinder 188, the cylinder 188 supports the bearing surface 50 against downward movement. Alternatively, a stop 208 may maintain the bearing surface 50 in a horizontal orientation during positioning of the trailers 32, 34 on the bearing surface 50. The stop 208 maybe embodied as a square beam 210 extending upwardly from the base 170. The top of the beam 210 may secure to a plate 212 to distribute forces from the beam 210 to the bearing surface 50.

Referring to FIG. 6, The hydraulic cylinder 188 and piston 190 may tip the bearing surface 50 as illustrated. The bearing surface 50 typically rotates through an angle sufficient that gravitational forces are enabled to draw the cargo from the trailers 32, 34. A rotation of approximately 50 degrees has proven adequate. If the cargo is not wood debris or similarly long, stiff, binding material 40 degrees suffice, and sometimes 30.

During rotation, the center of gravity 220 of the trailers 32, 34 and bearing surface 50 may cross over the pivot 178. As a result, gravity will tend to urge the bearing surface 50 to continue rotating. It will then be necessary for the actuator 186 to change the direction of application of any lifting force and instead resist further rotation of the bearing surface 50. In some embodiments, hydraulic fluid directed toward the cylinder 188 may pass through an over-center valve, to direct hydraulic fluid toward an opposite face of the piston 190, resisting extension of the piston 190 from the cylinder 188, rather than promoting it, as soon as the center of gravity 220 crosses over the pivot 178.

Figure 8:
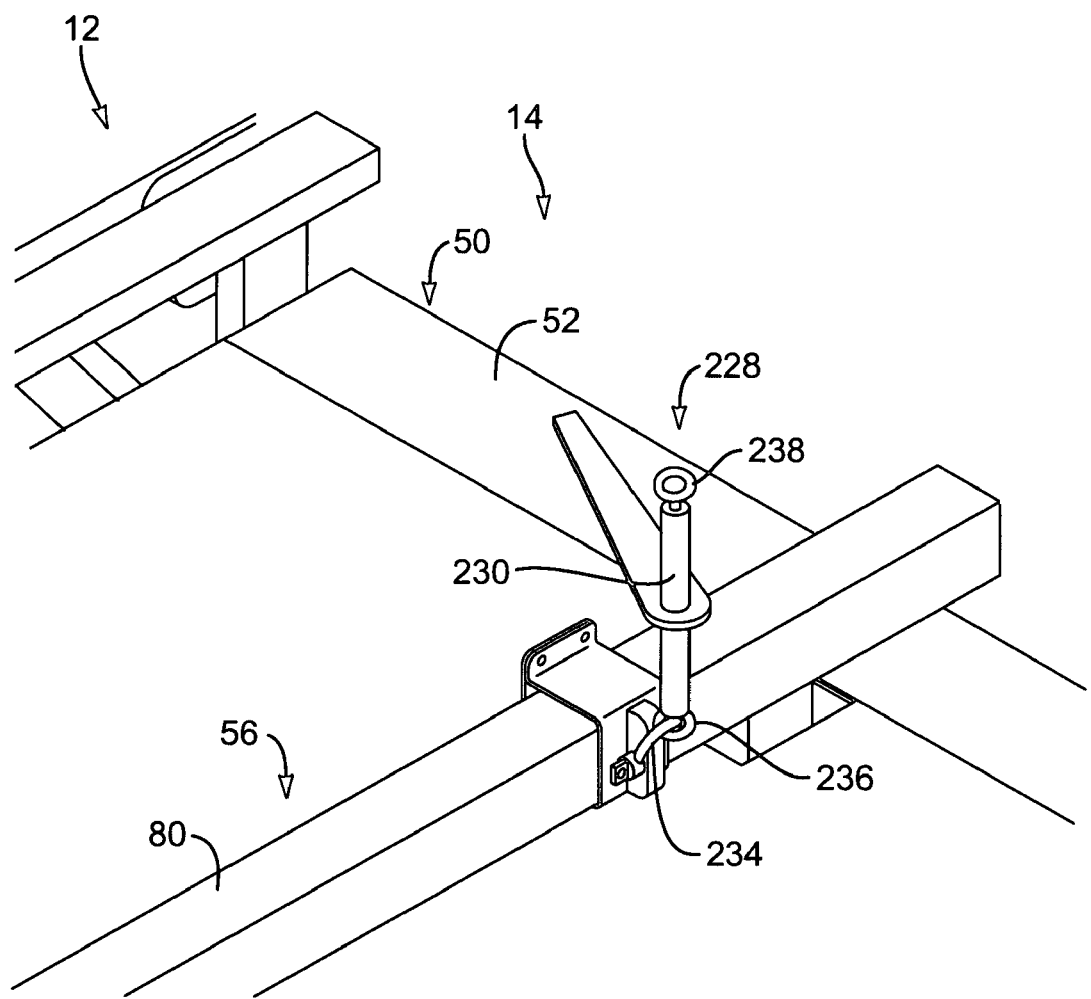
FIG. 8 is a perspective view of a front anchor in accordance with the invention.

Referring to FIG. 8, a front anchor 228 may secure a truck 30 (e.g. tractor 30) against tipping during the unloading process. In some embodiments a front anchor 228 may secure to the wheel guide 56 near the forward end 14 of the tipping station 12. Alternatively, the front anchor 228 may secure directly to the bearing surface 50. In some uses of the apparatus 10, snow and ice may be present, even prevalent. Accordingly, securement of the front anchor 228 to the wheel guide 56 may raise the front anchor 228 above snow and ice on the bearing surface 50 to promote accessibility.

A front anchor 228 may be embodied as a comealong 230 (e.g. boomer, winch, ratchet, etc.). Any apparatus known in the art may serve for increasing tension in a mechanism securing one structure to another. For example, any embodiment of a comealong 230 known in the art may be used. In some embodiments of a front anchor 230, the comealong 230, or like apparatus, may remain secured to a fastener 232 secured to the wheel guide 56 or bearing surface 50. In typical embodiments, the fastener 232 will permit the comealong 230 to rotate relative to the bearing surface 50 in order to move the comealong out of the way of the truck 30 and trailers 32, 34 as they are driven off the unloading station 12. Accordingly, the fastener 232 may be a 'U' bolt 234 fitting through an eye 236 formed in the comealong 230. A second eye 238 may selectively secure to a hook, post, or other such structure, formed on the front bumper or frame of the truck 30.

Figure 9:
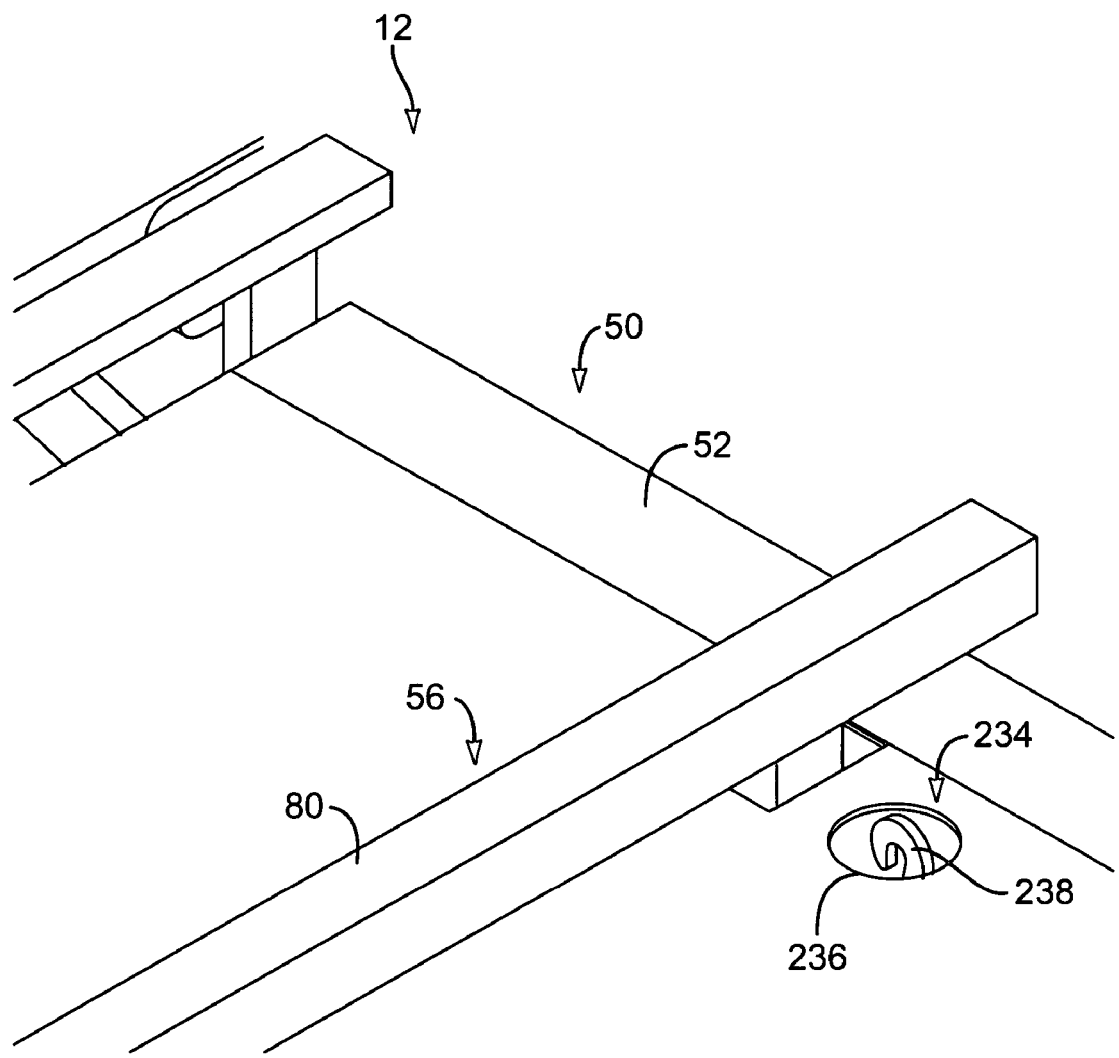
FIG. 9 is a perspective view of an alternative embodiment of a front anchor in accordance with the invention.

Referring to FIG. 9, given the icy conditions that may exist on an unloading station 12, a comealong 230 that remains secured to the bearing surface 50 may become encrusted or buried in snow and ice. Accordingly, a comealong 230 may remain secured to the front bumper, frame, or other structure, of the truck 30. A receptacle 240 may be provided to provide a securement point for the comealong 230. In some embodiments, an aperture 241 may be formed in the sheet 52.

The receptacle 240 may be embodied as a hook 242, post 242, rod 242, or like structure capable of securement to a comealong 230 or the like, extending into the aperture 241 and positioned flush with the sheet 52 or below the sheet 52. Such an embodiment permits the receptacle 240 to be self-clearing. For example, the aperture may be made sufficiently large that it will not easily clog with snow. Thus, snow and ice will not hinder access to the receptacle 240.

Figure 10:
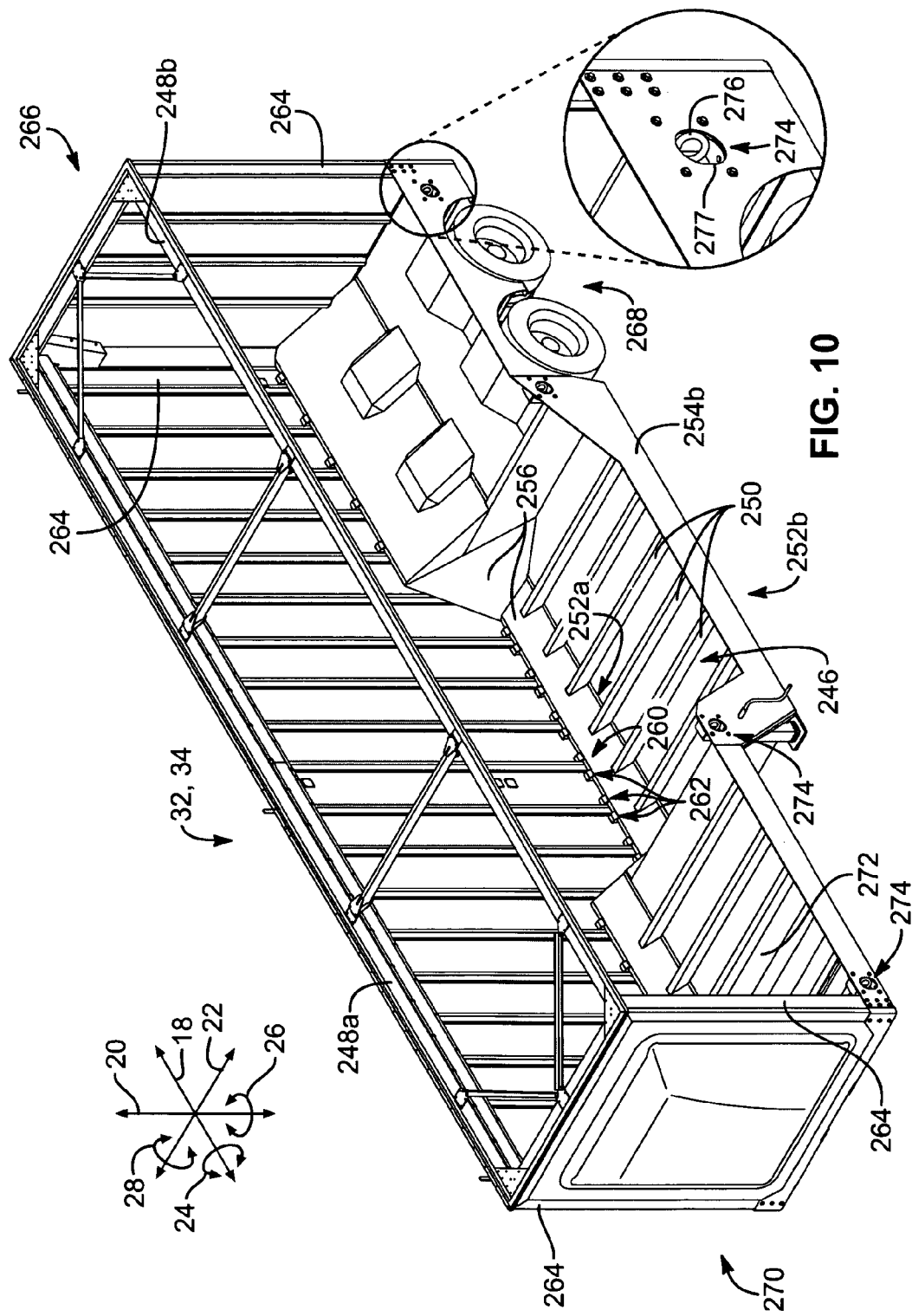
FIG. 10 is a cutaway perspective view of a trailer in accordance with the invention.
Figure 11:
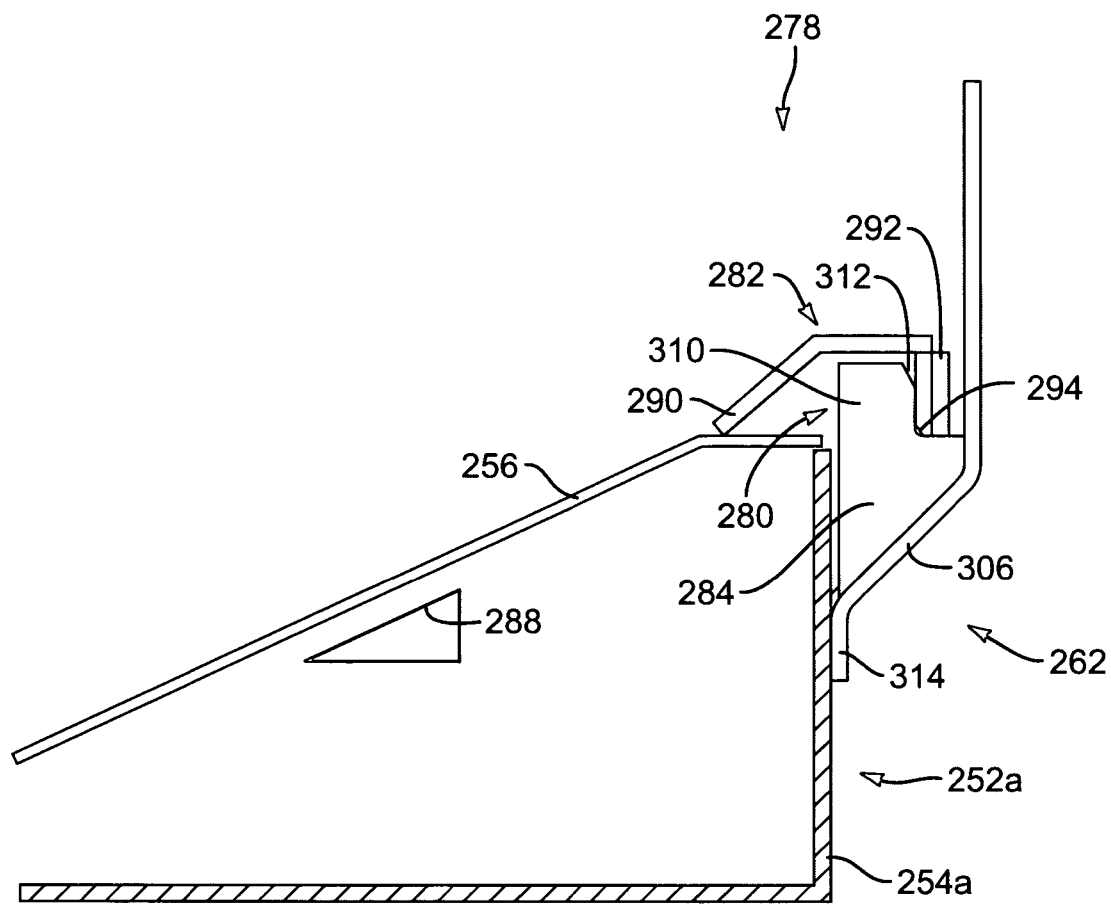
FIG. 11 is a side view of a catch in accordance with the invention.

Referring to FIGS. 10 and 11, a trailer 32, 34 may have several significant functional features. In typical embodiments in accordance with the present invention, both the lead trailer 32 and the pup trailer 34 function similarly. Accordingly FIG. 11 illustrates the pup trailer 34 but the functional features referred to below may belong to both the lead trailer 32 and the pup trailer 34.

For certain cargos that include a plurality of large irregularly shaped masses, it may be particularly important to remove structures from a trailer 32, 34 that may interfere with unloading thereof. Furthermore, in cargos consisting of both large and small bodies, material may tend to collect in areas (e.g. blind corners) of the trailer that are not positioned such that the material is drawn out when the trailer is tipped. Accordingly, support for the floor 246 of the trailers 32, 34 may be provided by upper beams 248a, 248b. Structural members in the floor 246 may then be configured to avoid interference with unloading cargo while maximizing volume.

For example, the cross members 250 in the floor 246 may extend in a lateral direction 22. For less dense cargo, placement of the cross members 250 above the floor 246 may be desirable to maximize the volume available to hold cargo. Lateral extension of the cross members 250 will enable cargo to slide along the cross members 250 during tipping, rather than be obstructed by them as might be the case for longitudinally extending structural members.

However, laterally extending cross members 250 do not resist bending in the transverse plane extending in the longitudinal direction 22. Accordingly, longitudinal supports 252a, 252b may extend along the sides of a trailer 32, 34 and provide support against bending. However, longitudinal supports 252a, 252b may be limited in bulk to avoid interfering with the unloading of cargo. Inasmuch as stiffness against bending would require a large vertical dimension, if longitudinal supports 252a, 252b were independently capable of bearing loads they would have a large vertical dimension. A large vertical dimension would either create a large lip above the floor hindering unloading of cargo, or would require that the floor 246 be raised thereabove, thereby reducing the volume of a trailer 32, 34.

However, the longitudinal support 252b is not positioned near the door 36 and its vertical dimension may be large enough for the longitudinal support 252b to independently bear bending loads, inasmuch as no cargo will need to pass thereover during unloading. In certain embodiments in accordance with the current invention, doors 36 may be provided on either side of a trailer 35, in which case both longitudinal supports 252a, 252b may be shortened vertically to facilitate unloading.

The longitudinal supports 252a, 252b and floor 245, and cross members 250 may be constructed such that without support from the upper beam 248a they would fail or otherwise not function properly. For example, longitudinal supports 252a, 252b and floor 245, and cross members 250 may be made such that unsupported one or more of them they would fail prematurely due to fatigue, excessive bending, excessive yielding, or other form of failure.

A longitudinal support 252a, 252b is typically configured as a beam extending along the length of the trailer 32, 34. For example, longitudinal support 252b may be a beam 254b extending along the length of the trailer 32, 34. A longitudinal support 252a may be embodied by a similarly configured beam 254a. A ramp 256 may extend from the floor 246 to the top of the beam 254a to facilitate unloading of cargo.

A door 36 may transfer loads between the floor 246 and an upper beam 248b to limit bending deflections of the longitudinal support 252a. The upper beams 248a, 248b may be increased in size to bear such loads because they are not in a position to interfere as significantly with unloading. Furthermore, the door 36 provides structural support by bearing shear forces and by distributing the larger bending moments developed at the center of the trailer 32, 34 across the entire upper beam 248a. A latching system 260 may then enable latching of the door 36 in a manner allowing the lower edge portion of door 36 to exert an upward force on the longitudinal support 252a. A latching system 260 may be any system known in the art to provide such functionality.

A latching system 260 may comprise a plurality of catches 262 spaced apart from one another along the longitudinal support 252a. The distance between the catches 262 may depend on the expected loads at a particular point along the longitudinal support 252a, with the catches being spaced closer together in comparatively highly loaded portions of the longitudinal support 252a. Alternatively, the catches 262 may each be separated from one another by the same distance.

Corner supports 264 positioned at the four corners of the trailer 32, 34 may support the upper beams 248a, 248b. The corner supports 264 are typically dimensioned to bear the weight of the door 36 as well as the loads transferred to the door 36 from the floor 246. The rearward end 266 of the trailer 32, 34 may rest on a wheel assembly 268. The forward end 270 of the trailer 32, 34 may be supported proximate a point 272 by a hitching system of the truck 30. In embodiments of the trailers 32, 34 implemented as a "B-Train" trailer system, the forward end 270 of the pup trailer 34 rests on a hitch assembly forming part of the lead trailer 32. The forward end 270 of a "B-Train" lead trailer 32 rests on a hitch assembly secured to the truck 30.

Anchor receptacles 274 may distribute along the trailer 32, 34 for engagement with the fasteners 110 of the anchors 62. In the illustrated embodiment, the anchor receptacles are rings 276 positioned within cavities 277 formed in the beam 254b.

Referring specifically to FIG. 11, while still referring generally to FIG. 10, a catch 262 may include a receptacle 278 and a fastener 280. In the illustrated embodiment, the receptacle is embodied as a pocket 282 secured to the longitudinal support 252a by means of welds, bolts, or the like. The fastener 280 may be embodied as a hook 284 secured to the door 36 by means of welds, bolts, or the like.

The pocket 282 may secure to the ramp 256 forming part of the longitudinal support 252a. The ramp 256 may secure to the top of the longitudinal beam 254a and descend gradually to the floor 246. The slope 288 of the ramp 176 may be chosen to promote the unloading of cargo. A slope 288 of approximately 25 degrees has been found to be adequate.

The pocket 274 may include a rear plate 290 formed at approximately the same slope 288 to promote unloading of cargo. The pocket 282 may include a front plate 292 oriented to retain a hook 284 In the illustrated embodiment, the front plate 292 is oriented substantially vertically. The front plate 292 may have an inner edge 294 that is chamfered, or otherwise formed to facilitate insertion of the hook 284. The front plate 292 may secure directly to the rear plate 290. Alternatively, a top plate 296 may secure to the rear plate 290 and the front 292 to maintain the front plate 292 spaced laterally apart from the rear plate 290. A side plate 293, or side plates 293, may secure on either side of the rear plate 290, front plate 292, and top plate 296 to increase rigidity of the pocket 282 and to inhibit longitudinal movement of the hook 284. Of course, the pocket 282 may be any structure capable of retaining the hook 284, which does not unduly inhibit unloading of cargo.

A door 36 may be formed with a lip 306 extending inwardly in the lateral direction 22. The hook 284 may comprise a plate, or other structure, fitted to the contour of the lip 306 with a prong 310 extending upwardly therefrom. The prong 310 may include a chamfered edge 312 to facilitate insertion of the prong into the pocket 282. The hook 284 and the lower edge 314 of the door 36 may be formed to rest flush with the beam 254a.

In some embodiments the chamfered edge 312 of the hook 284 and the chamfered edge 294 of the front plate 292 may allow the door 36 to be opened at one end and allowing the force of the cargo to force the hook 284 to slide out of engagement with the pocket 282.

Figure 12:
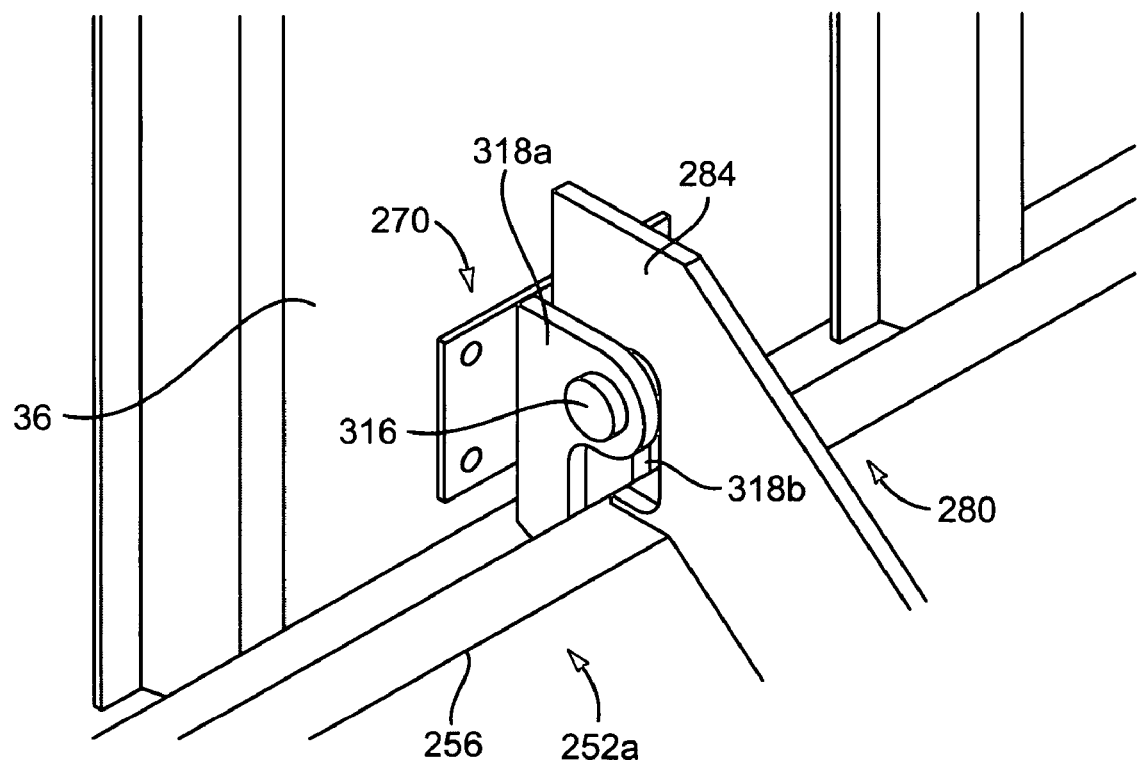
FIG. 12 is a perspective view of an alternative embodiment of a catch in accordance with the invention.

Referring to FIG. 12, while continuing to refer to FIG. 10, an alternative embodiment of a catch 262, a fastener 280 may secure to the longitudinal support 252a, and a receptacle 278 may secure to the door 36. For example, a receptacle 278 may be a bar 316 positioned to extend between two side brackets 318a, 318b welded, or otherwise secured, to the door 36. The fastener 280 may be a hook 284 secured to the ramp 256 and oriented to receive the bar 316 when the bar 316 is brought from below the hook 284 into engagement with the hook 284.

Figure 13:
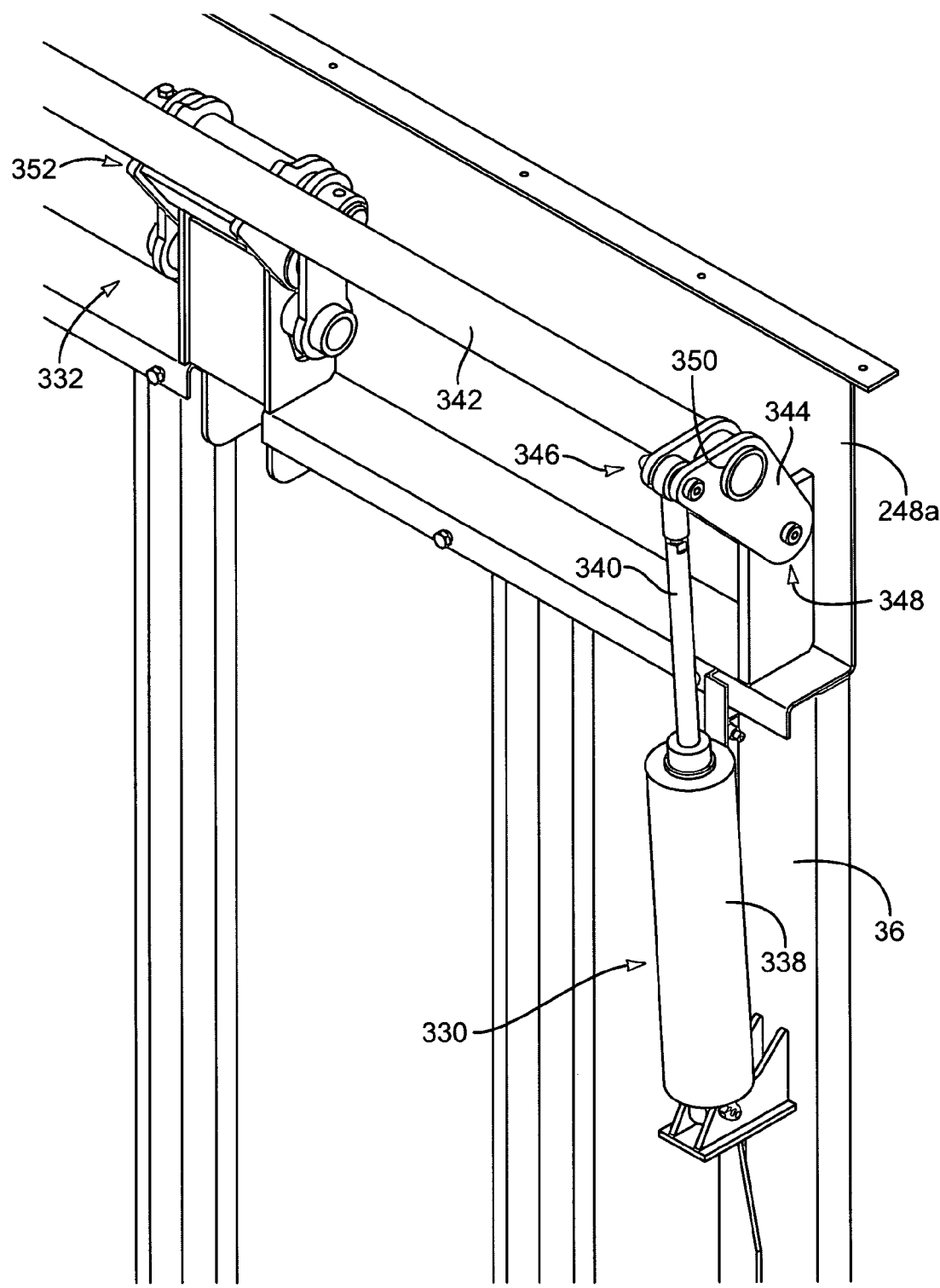
FIG. 13 is a cutaway view of a lifting and locking mechanism in accordance with the invention.

Referring to FIG. 13, the trailers 32, 34 may include a lifting mechanism 330 that lifts the door 36 and brings the fastener 280 into engagement with the receptacle 278. A locking mechanism 332 may maintain the fastener 280 in engagement with the receptacle 278. Typically a locking mechanism 332 will maintain an upward force on the door 36. The locking mechanism 332 may be positioned at any point on the door 36 allowing the door 36 to be fixed relative to the corner supports 264, the upper beam 248a, or the longitudinal support 252a. Accordingly, the locking mechanism 332 maybe any locking system capable of fixing the position of the door 36 relative to the corner supports 264, the upper beam 248a, or the longitudinal support 252a and having sufficient strength to bear loads such as the weight of the door 36 and loads transferred from the floor 246 to the door 36.

In the illustrated embodiment, the lifting mechanism 330 is a hydraulic cylinder 338 and piston 340. The piston 340 may raise a shaft 342 extending along the upper beam 248. The piston 340 may secured to an arm 344 near the end 346 of the arm 344. The other end 348 of the arm 344 pivotally secures to a structural member of the trailer 32, 34, such as the upper beam 248 or corner support 264. The shaft 342 secures to the arm 344 at a position suitable to transfer force adequately between the piston 340 and the shaft 342. The position of the point of securement of the shaft 342 to the arm 344 may also be chosen to ensure that the range of motion of the piston 340 translates into an adequate translation of the shaft 342 to bring the fastener 280 into engagement with the receptacle 278. In the illustrated embodiment, the shaft 342 secures to the arm 344 between the ends 346, 348. The shaft 342 typically secures rotatably to the arm 344, for example, by passing through an aperture 350 sized to allow rotation.

The shaft 342 may secure directly to the door 36 to lift the door 36. Alternatively, in the illustrated embodiment, the shaft 342 may secure to a linkage 352 serving to transfer a lifting motion from the shaft 342 to the door 36. In the illustrated embodiment the linkage 352 may also function as the locking mechanism 332.

The lifting mechanism 330 may include two sets of hydraulic cylinders 338 and pistons 340 positioned near either end 266, 270 of the trailer 32, 34. A locking mechanism 332 may likewise include two linkages 352 positioned near either end 266, 270 of the trailers 32, 34. The configurations of the hydraulic cylinder 338, piston 340, and linkage 352 at one end 266 of the trailers 32, 34 may substantially mirror the configuration of the hydraulic cylinder 338, piston 340, and linkage 352 at the end 270 of the trailers 32, 34.

Figure 14:
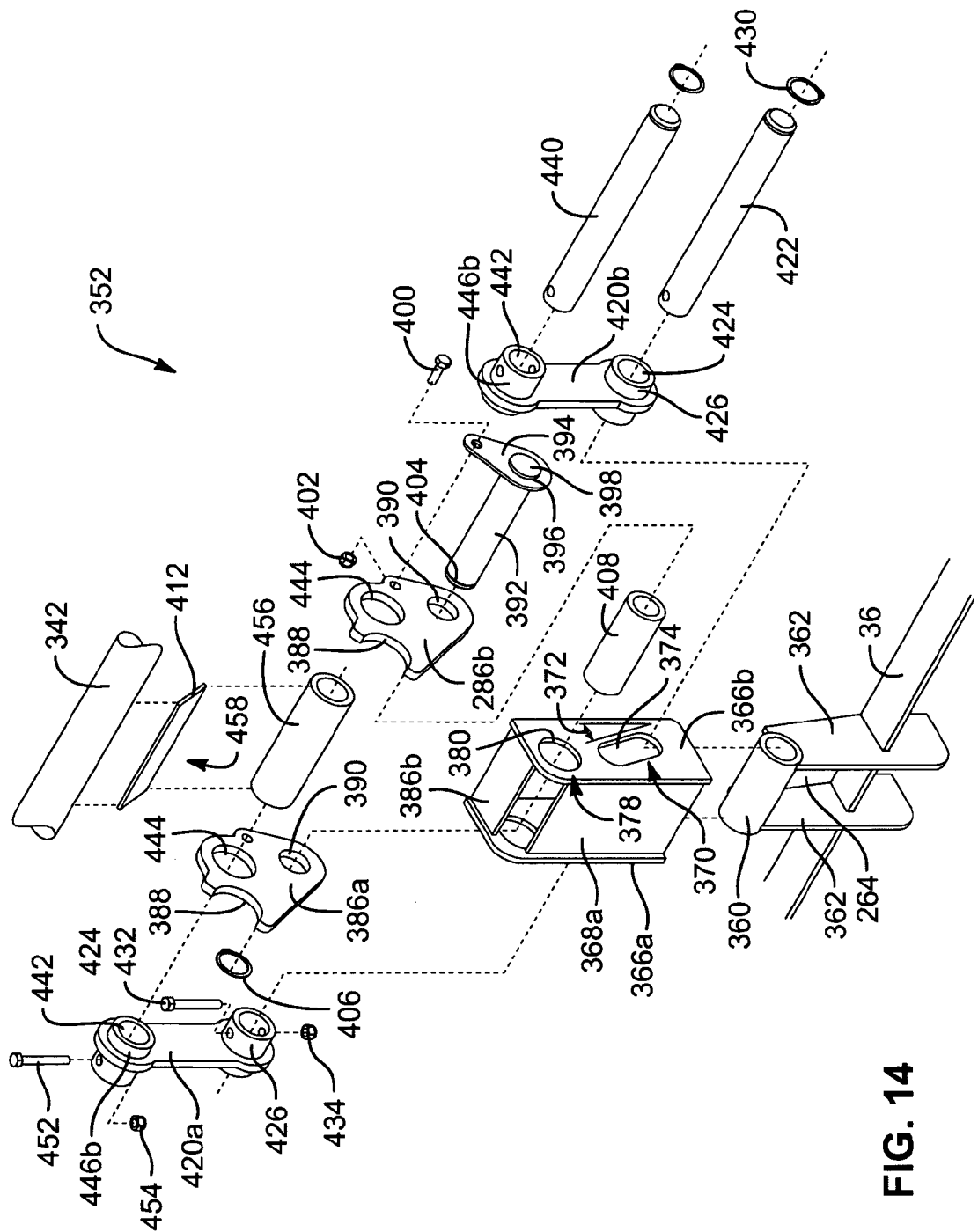
FIG. 14 an exploded view of a lifting and locking system in accordance with the invention.

Referring to FIG. 14, the linkage 352 may be any linkage lockable in an over-center position. For example, the linkage 352 may include the illustrated links to accomplish its locking function. The linkage 352 may engage a bushing 360 secured to the door 36 by means of side plates 362 welded, or otherwise secured, to the door 36. A bearing plate 264 may secure to the bushing 360 along one of its edges by means of welds, or other fasteners. The bearing plate 264 may also secure to the side plates 362 along its edges. In some embodiments, the bushing 360 may be welded directly to the door 36. Alternatively, the side plates 362 may have apertures serving the function of the bushing 360. Of course, various other structures are equivalent and may provide an aperture for receiving a shaft or the like.

Guide plates 366a, 366b may be positioned on either side of the bushing 360. Bearing cross plates 368a and 368b may secure to the guide plates 366a, 366b by welds, or other securement mechanisms, and maintain the guide plates 366a, 366b in a fixed position relative to one another. The guide plates 366a, 366b also secure to the upper beam 248a by means of welds, or other securement means. The guide plates 366a, 366b may be planar or any other shape providing sufficient structural strength. Likewise, a single plate 366a may be used.

The guide plates 366a, 366b may include a guide 370. The bushing 360 will typically be directed by the guide 370 during lifting and locking of the door 36. The guide 370 may be a groove, rail, or any such structure, engaging the bushing 360, its equivalent structure, or the side plates 362 in a manner allowing the guide 370 to direct the movement of the bushing 360, or its equivalent structure. The guide 370 is typically oriented at an angle 372 such that lifting the door 36 also brings the door 36 closer to the body of the trailer 32, 34. The angle 372 may facilitate locking of the linkage 352 as discussed below. In the illustrated embodiment, the guide 370 is an elongate aperture 374.

A pivot 378 may also be provided on the guide plates 366a, 366b. The pivot 378 is any structure that secures to a second structure and enables relative rotation of the second structure as well as the transfer of loads between the pivot 378 and the second structure. Accordingly, the pivot 378 may be a post, or like structure, secured or formed on a guide plate 366a, 366b for insertion into an aperture on a second structure. In the illustrated embodiment, the pivot 378 is embodied as apertures 380 formed in the guide plates 366a, 366b for receiving a shaft, or the like.

The linkage 352 may include a driven link 386a, or driven links 386a, 386b, which secure to the shaft 342 and are rotated thereby as the shaft 342 is lifted by the piston 340. The driven links 386a, 386b may rigidly secure to the shaft 342. Alternatively, the driven links 386a, 386b may rotatably secure to the shaft 342, and the arm 344 may fixedly, or rotatably, secure to the shaft 342. In the illustrated embodiment, the driven links 386a, 386b include a surface 388 adapted to receive the shaft 342. For example, the surface 388 may be curved to receive a round shaft 342. In the illustrated embodiment, the shaft 342 fixedly secures to the driven links 386a, 386b by welds, or any other suitable securement mechanism.

The driven links 386a, 386b each secure to the pivot 378 of the guide plates 366a, 366b. In the illustrated embodiment, the driven links 386 include an aperture 390. The apertures 390 may fit over a post or like structure formed on the guide plates 366a, 366b. In the illustrated embodiment, a shaft 392 passes through the apertures 390 of the driven links 386a, 386b and through the apertures 380 of the guide plates 366a, 366b.

Various means may serve to retain the shaft 392 in engagement with the apertures 380, 390. In the illustrated embodiment, a retaining bracket 394 having an aperture 396 extending around the shaft 392 may serve this purpose. The bracket 394 may be welded, or otherwise fixedly secured, to the end 398 of the shaft 392. Alternatively, the bracket may have no aperture 396 and simply be welded, bolted, riveted, or otherwise fastened to the end 398 of the shaft 392. The bracket 394 may also fasten to the driven link 386a by means of a bolt 400, or other such fastener mechanism, extending through both the bracket 394 and the driven link 386a and being secured with a nut 402. The end 404 of the shaft 392 may also include a lock structure for preventing removal thereof. In the illustrated embodiment a snap ring 406 prevents removal of the shaft 392. Of course, various other structures for retaining the shaft 392 are possible, such as set screws, keys, lynch pins, or the like.

A bushing 408 may insert through the apertures 380 in the guide plates 366a, 366b. The bushing 408 may be sized to extend through the apertures 380 during operation of the linkage 352. The shaft 392 may then extend through the bushing 408 without contacting the guide plates 366a, 366b.

Lifting links 420a, 420b may pivotally secure to the bushing 360, or its equivalent. The lifting links 420a, 420b directly exert a lifting force on the door 36. Any lifting structure known in the art for pivotally securing one structure to another may be used. For example, the lifting links 420a, 420b may pivotally secure to posts extending from the side plates 362. In the illustrated embodiment, the lifting links 420a, 420b secure to the bushing 360 by a shaft 422 passing through the bushing 360 and apertures 424 formed in the lifting links 420a, 420b.

In some embodiments, bushings 426 may insert into the apertures 424 with the shaft 422 extending through the bushings 426. The bushings 426a, 426b may be welded or otherwise secured to the lifting links 420a, 420b. For example, slip rings, set screws, or the like, may prevent unintended removal of the bushings 426a, 426b from the lifting links 420a, 420b. The lifting links 420a, 420b may secure to the bushings 426a, 426b such that the bushings 426a, 426b maintain the lifting links 420a, 420b separated from the guide plates 366a, 366b. Separation may be necessary to provide room for the driven links 386a, 386b, which may be positioned between the lifting links 420a, 420b.

The bushings 426a, 426b secure to the shaft 422 by any appropriate connector structure, such as bolts, snap rings, set screws, or the like. The bushings 426a, 426b may secure either fixedly or pivotally to the shaft 422. In the illustrated embodiment, a snap ring 430 secures to the shaft 422 near the bushing 426b. The bushing 426a is secured to the shaft 422 by a bolt 432 extending through both the bushing 426b and the shaft 422 and held in place by a nut 434.

The lifting links 420a, 420b also secure to the driven links 386a, 386b in order that the driven links 386a, 386b may either lift or lower the lifting links 420a, 420b, depending on the direction of rotation. The lifting links 420a, 420b may pivotally secure to the driven links 386a, 386b by any securement structure for pivotally securing one member to another. For example, a lifting link 420a, 420b may be bolted to a driven link 386a, 386b, respectively. Alternatively, either a lifting link 420a, 420b or driven link 386a, 386b may have a post, or like structure, engaging an aperture, or like structure, on a driven link 386a, 386b or lifting link 420a, 420b, respectively.

In the illustrated embodiment, a shaft 440 extends through apertures 444 in the driven links 386a, 386b and through apertures 442 in the lifting links 420a, 420b. In some embodiments, bushings 446a, 446b may extend through the apertures 444 in the lifting links 420a, 420b. The bushings 446a, 446b may be fixed relative to the lifting links 420a, 420b by means of welds, or any other securement means preventing the bushings 446a, 446b from disengaging from the lifting links 420a, 420b. In some embodiments, the lifting links 420a, 420b may secure to the bushings 446a, 446b such that the lifting links 420a, 420b are separated from the driven links 386a, 386b. Separating the lifting links 420a, 420b and the driven links 386a, 286b may reduce or prevent interference between the lifting links 420a, 420b and the ends of the shaft 392 or the bolt 400. The bushings 446a, 446b typically do not extend into the apertures 444 in the driven links 386a, 386b.

The bushings 446a, 446b secure to the shaft 440 by any suitable securement structure. In the illustrated embodiment, a snap ring 450 prevents removal of a bushing 446b from the shaft 440. A bolt 452 may extend through a bushing 446a and the shaft 440 and be held in place by a nut 454. Of course, various fasteners may accomplish this retaining function, such as lynch pins, set screws, keys, or the like.

In some embodiments, a bushing 456 may extend between and through the apertures 444 in the driven links 386a, 386b. The bushing 456 may be fixed to the driven links 386a, 386b by welds, fasteners, or the like. Alternatively, the bushings 446a, 446b on either side may keep the bushing 456 positioned within the apertures 444.

The linkage 352 includes a number of parts rotatably secured to one another. Accordingly, the weight of the door 36 secured to the linkage 352 may tend to rotate the linkage into unsafe positions or into positions placing undue strain on parts of the linkage 352. Accordingly, a stop 458 may serve to resist or prevent the linkage 352 moving into such positions. In one embodiment, a stop 458 is a plate 460, or other such structure 4460, secured to the bushing 456 and to the shaft 342, by a weld, fastener, or the like. The plate 412 may interfere with the guide plates 366a, 366b or the cross plates 368a, 368b and thereby limit the range of motion of the shaft 342 and driven links 386.

Figure 15A:
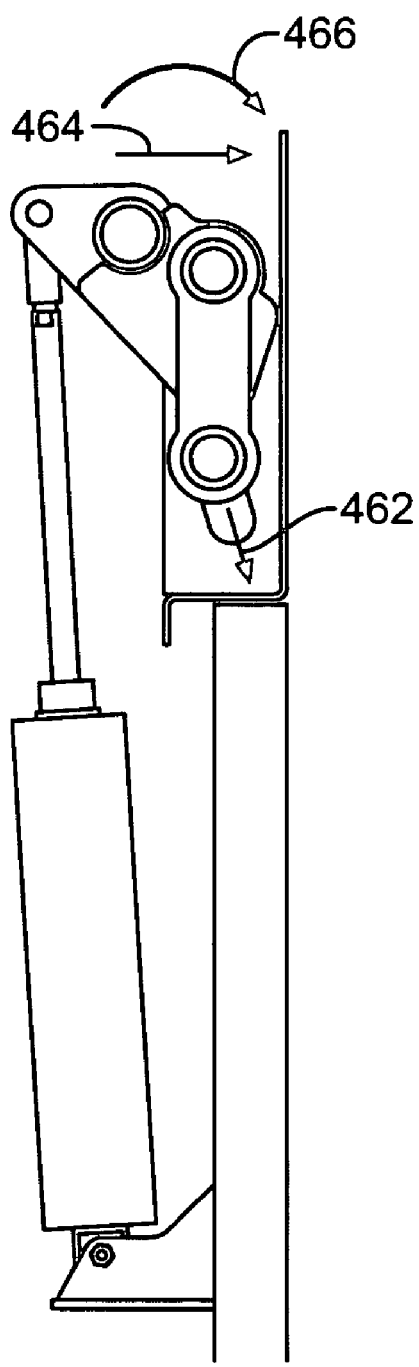
FIGS. 15A-15B are side views of a lifting and locking system in accordance with the invention.
Figure 15B:
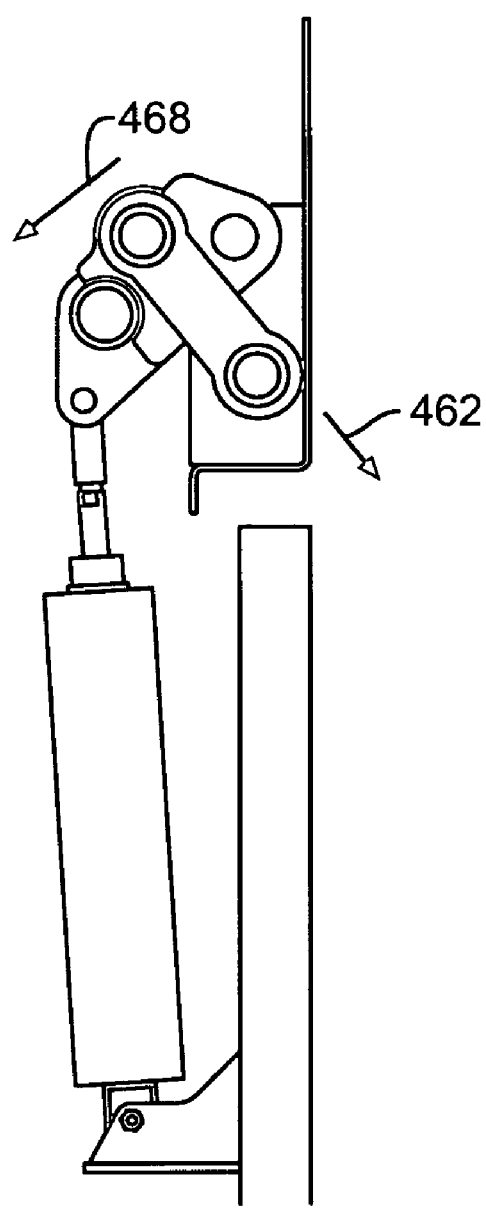

Referring to FIGS. 15A and 15B, a linkage 352 may move through positions such as those illustrated. It will be understood that the range of movement of the linkage 352 is dependent on the dimensions of the driven links 386a, 386b, lifting links 420a, 420b and the guide plates 366a, 366b apparent in the side views of FIGS. 15A and 15B. Accordingly, several variations in the securement structures of the various links connecting to one another, and the configuration or disposition of the links not affecting the dimensions apparent in FIGS. 15A and 15B, may occur without materially altering the functionality of the linkage 352. Likewise, the kinematic behavior of the linkage 352, including the existence of an over-center position may exist through variations in the dimensions of the members of the linkage 352 illustrated in FIGS. 15A and 15B.

Referring to FIG. 15A, a door 36 may close as illustrated, with the linkage 352 in an over-center position. The over-center position shown may be characterized as one where the line of action 462 of the force exerted by the door tends to urge the linkage 352 to lift the piston 340 rather than be lifted by it. Another characteristic of the over-center position is that the weight of the door 36 tends to urge the linkage into a stable, closed position against some obstruction or the like, effectively causing the linkage to maintain the door 36 in a closed position. In the illustrated embodiment, the line of action 462 of the weight of the door 36 causes the lifting links 420a, 420b to pull in a direction 464 on the driven links 386a, 386b and drive them toward the upper beam 248a.

An alternative characterization of the over-center position is that it is one wherein the weight of the door 36 urges the linkage 352 into a position and wherein the dimensions of the links themselves render kinematically impossible further movement in the direction urged by the weight of the door 36. The lifting links 420a, 420b and the driven links 386a, 386b in the configuration shown in FIG. 15A cannot rotate further in direction 466 absent breakage or catastrophic deformation of one of the links 386.

Referring to FIG. 15B, the arm 344 may be lowered by the lifting mechanism 330, effectively rotating the lifting links 420a, 420b out of the over-center position and allowing the shaft 422 to descend the guide 370, thereby allowing the door 36 to descend. When the linkage 252 is not in the over-center position, the weight of the door exerted in a direction 462 causes the lifting links 420a, 420b to exert a force in a direction 468, which tends to rotate the driven links 386a, 386b in a direction permitting movement of the linkage 352.

Figure 16:
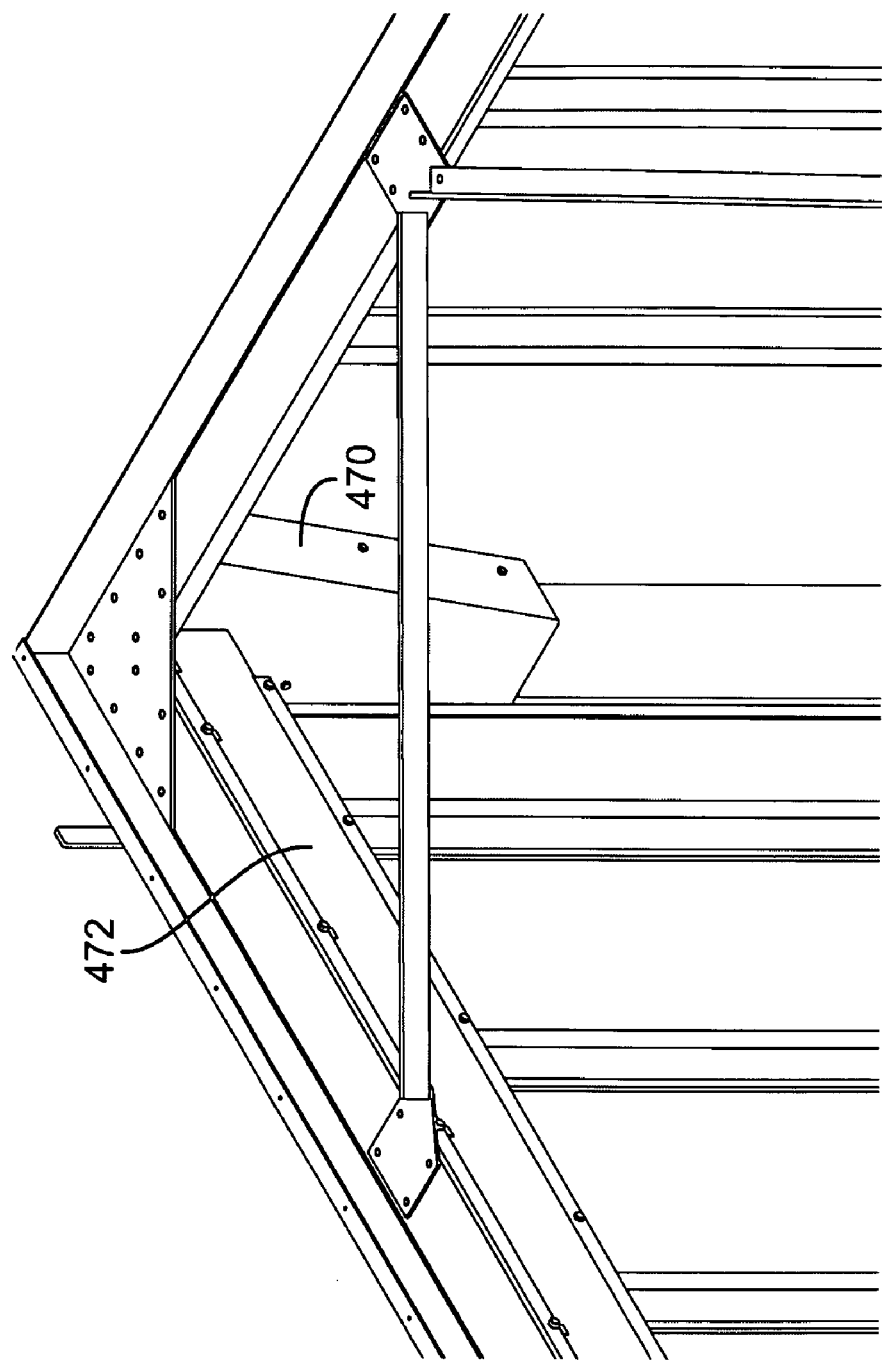
FIG. 16 is a perspective view of a housing for a lifting and locking system in accordance with the invention.

Referring to FIG. 16, a housing 470 may shield the lifting mechanism 330 from the cargo. Housings 470 exist both ends 266, 270 of the trailers 32, 34 for embodiments having a lifting mechanism 330 positioned at either end 266, 270. A second housing 472 may extend along the length of each or both of the trailers 32, 34 and shield the linkage 352 and shaft 342 from the cargo.

Figure 17:
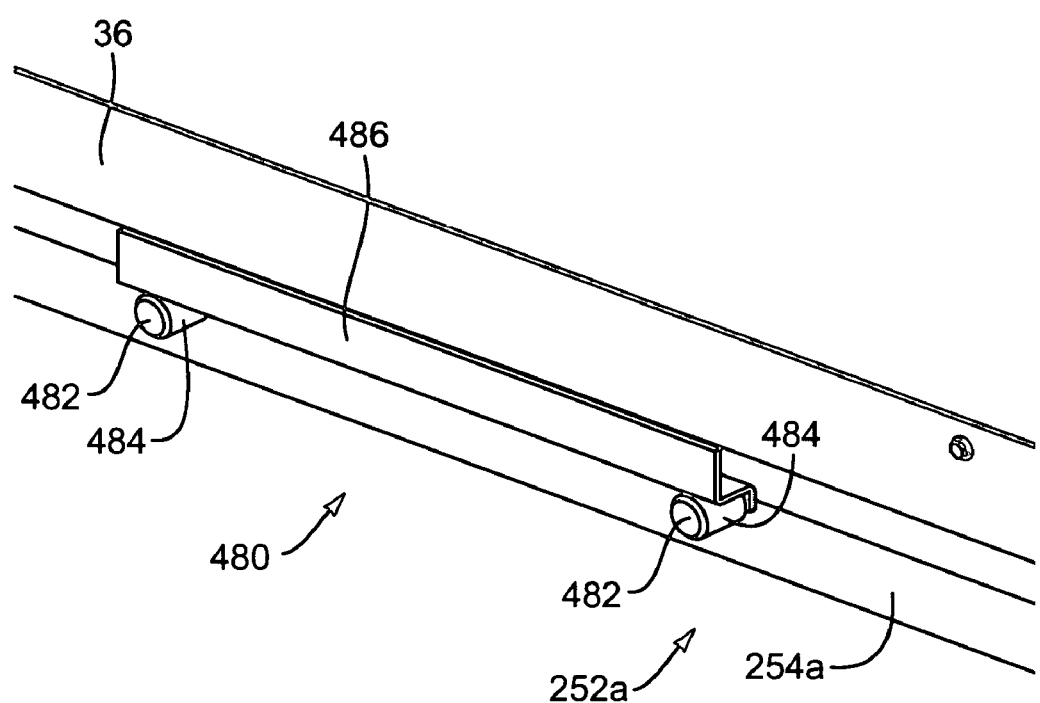
FIG. 17 is a partial perspective view of an end support in accordance with the invention.

Referring to FIG. 17, given that the trailers 32, 34 are supported near their ends 266, 270, the portions of the floor and lower supports 252a, 252b near the ends 266, 270 will be subject to a net upward force, rather than the net downward force existing throughout the middle of the trailers 32, 34. This phenomenon may be problematic for latching systems that require the door 36 to be brought into engagement with a locking mechanism from below. The problem arises from the fact that an upward deflection of the lower support 252a is dynamically equivalent to a downward movement of the door 36. Such a deflection could therefore disengage the door 36 from the lower support 252a.

Accordingly, a lock 480 may enable the door 36 to exert a downward force on the longitudinal support 252a near the ends 266, 270 of the trailers 32, 34. The lock 480 may be any suitable structure coupling the door 36 to the longitudinal support 252a and allowing the lower support 252a to exert an upward force on the door 36. For example, a lock 480 may be a pin 482, or pins 482, extending from the longitudinal support 252a. The pins 482 must typically remove or retract to allow the door 36 to open, inasmuch as the door typically translates downwardly during opening. The pins 482 may be removed and inserted manually into apertures 484, or may be manually extended and retracted. Alternatively, the pins 482 may be actuated hydraulically, pneumatically, or mechanically, to extend and withdraw. A bearing plate 486 may fasten to the door 36 to distribute loads more evenly along the door 36.

Figure 18:
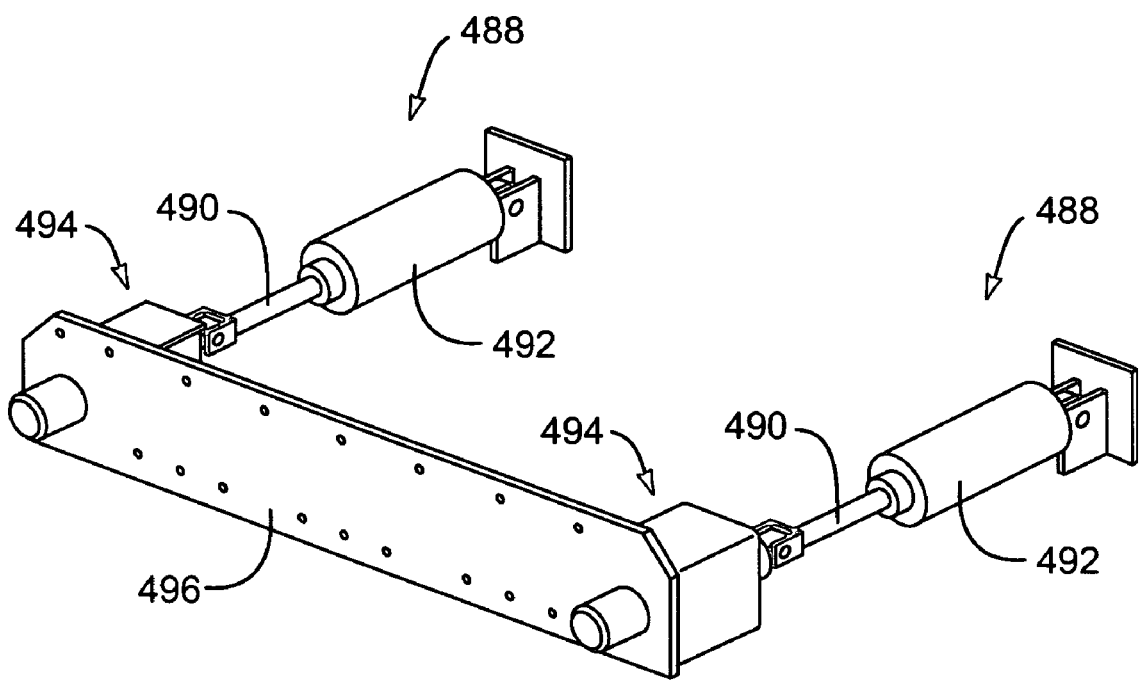
FIG. 18 is a cutaway perspective view of an end support in accordance with the invention.

Referring to FIG. 18, the pins 482 may be driven by actuators 488, such as hydraulic pistons 490 and cylinders 492. Alternatively, the actuators 488 may be any suitable pneumatic, electrical, or mechanical actuators or the like. The pins 482 may slide within guides 494 secured to a mounting plate 496. The mounting plate 496 may secure to the beam 254a by bolts, welds, or other fasteners.

Figure 19:
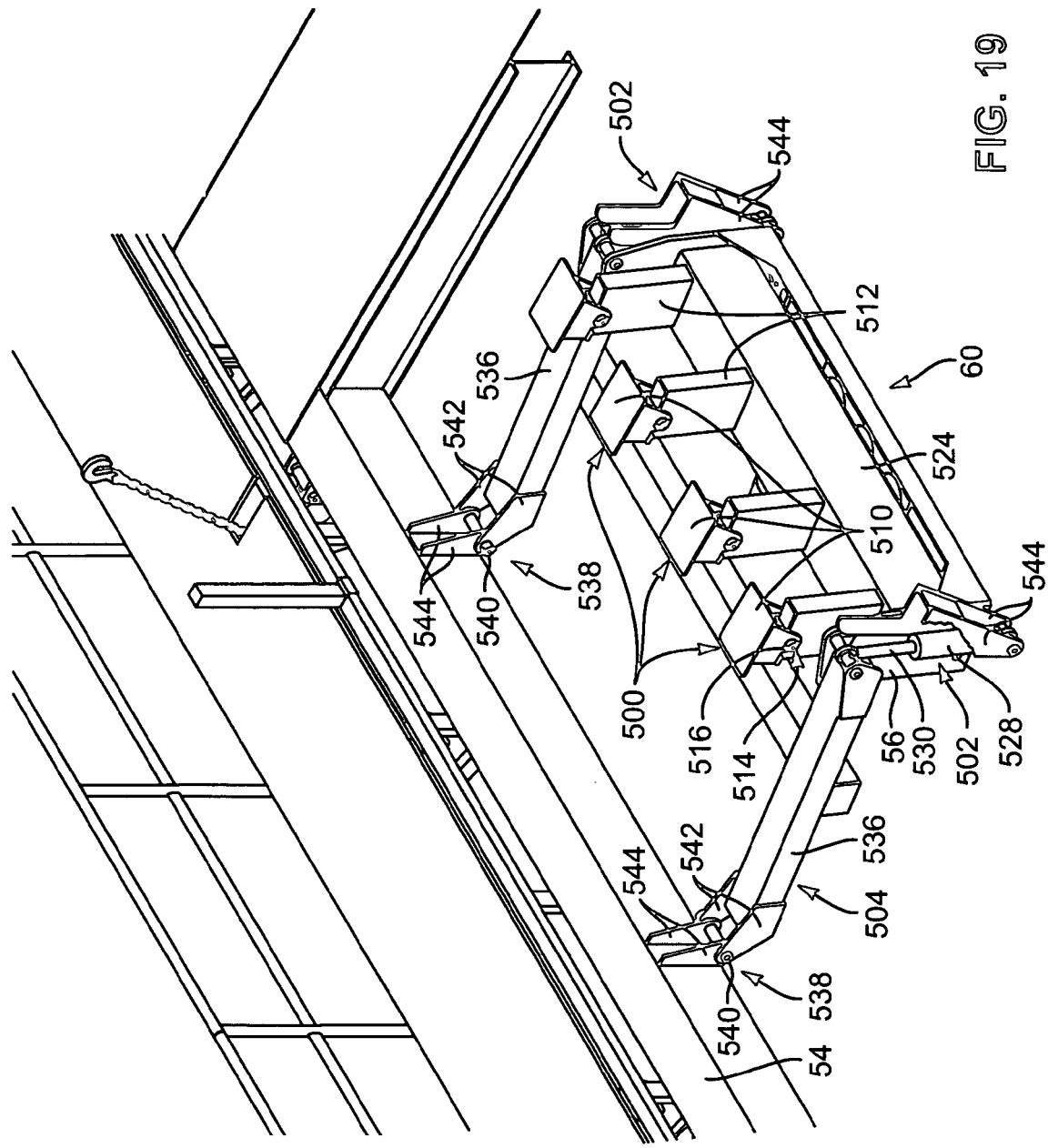
FIG. 19 is front quarter cutaway perspective view of an external support in accordance with the invention.

Referring to FIG. 19, in embodiments of the apparatus 10 using trailers 32, 34 whose doors 36 provide structural support for the longitudinal supports 252a, a belly support 60 will need to support the longitudinal supports 252a. This structural arrangement enables opening the door 36 and resists failure of the floor 246.

A belly support 60 may be any suitable structure for selectively supporting another structure. Accordingly, hydraulic, pneumatic, and mechanical lifts of all kinds may serve as belly supports 60, provided they are dimensionally compatible with the unloading station 12. In the illustrated embodiment, the belly support 60 is embodied as lifting pads 500 raised by an actuator 502. A guide 504 may guide the movement of the lifting pads 500.

Figure 20:
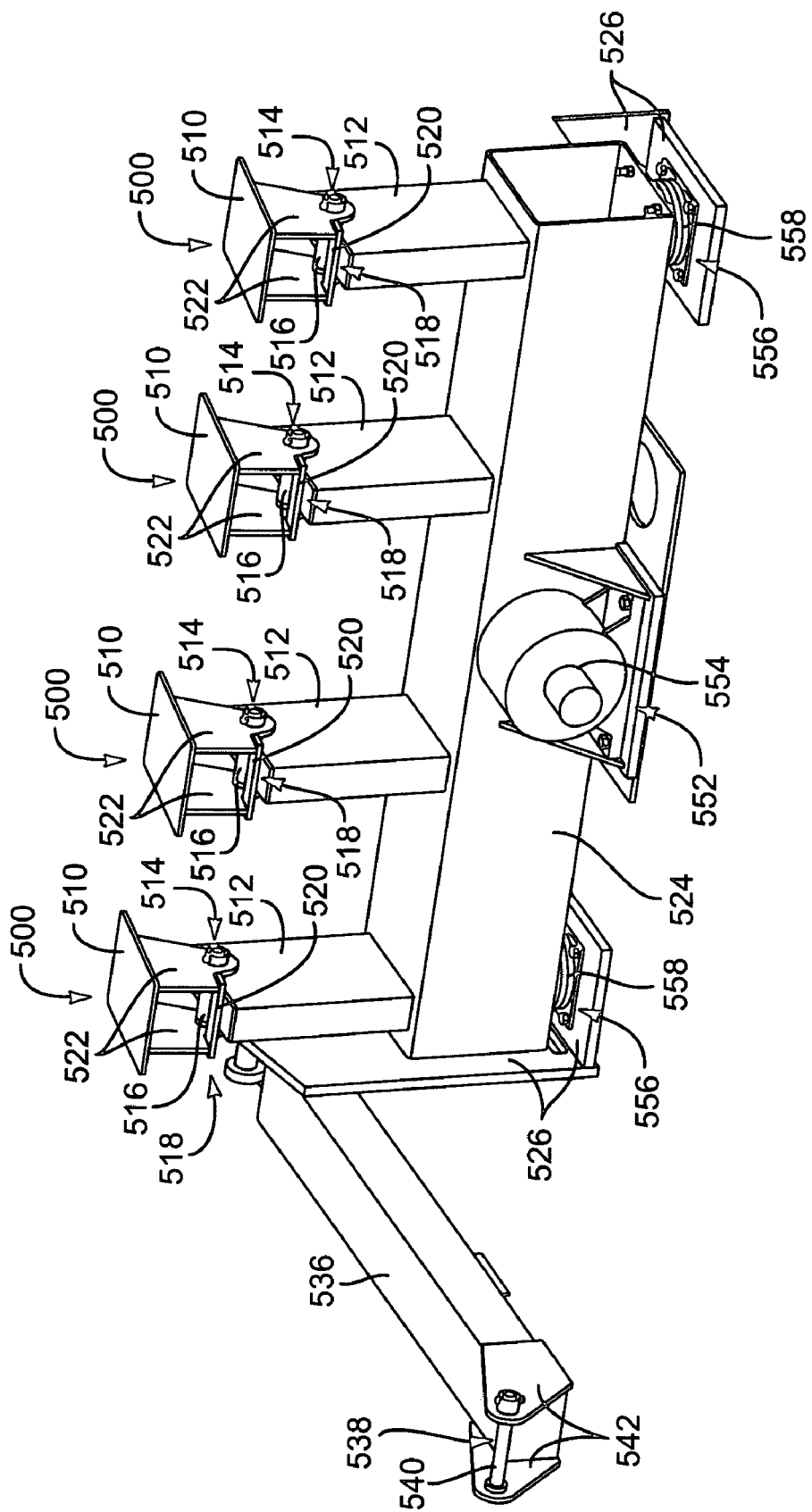
FIG. 20 is a rear quarter cutaway perspective view of an external support in accordance with the invention.

Referring to FIGS. 19 and 20, in the illustrated embodiment, the pads 500 may be plates 510 secured to standoffs 512. The standoffs 512 may maintain the pads 500 to the level of the sheet 52. The pads 500 may connect by means of a pivot 514, such as a shaft 516, to the standoffs 512. Stops 518 may maintain the pads 500 in an orientation suitable for engagement with lower supports 252a.

A stop 518, for example, may be necessary to ensure that as the plates 510 are brought up against the lower support 252a. The plates 510 will slide and rotate relative to the lower support 252a and seat flat against the lower support 252a. A stop 518 may be necessary to prevent an edge of a plate 510 from coming into initial engagement with the lower support 252a, gouging into the lower support 252a, and thus interfering with rotation of the plate 510.

A stop 518 may simply be a cross member 520 positioned to engage flanges 522 secured to the plate 510 for securing the plate 510 to the standoff 512. A stop 518 may be positioned such that when the flanges 522 rest against the stop 518, the plate 510 is positioned to seat substantially flat against the lower support 252a when the plate 510 is raised. Multiple pads 500 may secure along a single cross beam 524. Multiple pads 500 may provide better weight distribution. The standoffs 512 may secure fixedly to the cross beam 524. In some embodiments, the plates 510 may secure directly to the cross beam 524. Alternatively, the cross beam 524 may itself engage the lower support 252a directly. The ends of the cross beam 524 may rest in seats 526.

Pivotally securing the plates 510 to the standoffs 512 may enable the plates 510 to lie flat on the sheet 52 when the pads 500 are lowered. Inasmuch as the pads 500 may move along an arcuate path between lowered and raised positions, the pads 500 may also rotate slightly. Pivotally securing the pads 500 to the cross beam 524 may permit the plates 510 to shift into a horizontal position upon engagement with the trailers 32, 34 and when the plates 510 are lowered to the level of the sheet 52.

An actuator 502 may be, for example, two hydraulic cylinders 528 and pistons 530. Of course, any suitable actuating structure to accomplish the required motion may be used. The cylinders 528 may secure to mounts 532 secured to the undergirding members 54. The pistons 532 may pivotally secure to the seats 526.

A guide 504 may be embodied as arms 536 pivotally secured to an undergirding member 54 by pivots 538. The pivots 538 may be pins 540 extending through brackets 542 secured to the arms 536 and mounting plates 544 secured to an undergirding member 54. The arms 536 may fixedly secure to the seats 526 by means of welds, bolts, or other fastener structures.

An agitator 552 (e.g. accelerator, cyclic shaker, vibrator, etc.) may secure to the crossbeam 524 and vibrate the trailer 32, 34 to facilitate unloading of the cargo. The agitator 552 may be any suitable system. For example, a hydraulic, pneumatic, or electric motor 554 having an eccentrically mounted mass turning with a rotating shaft will provide a dynamic oscillation.

Dampers 556 may mount between the cross beam 524 and the seats 526. The damper may shield other components of the belly support 60 from the oscillation of the agitator 552. In the illustrated embodiment, the dampers 556 are embodied as springs 558 positioned between the cross beam 524 and the seats 526. Of course, any other suitable damping system or shock absorber may be engineered for this role. For example, a rubber pad, or other such inelastic isolator material may be used.

Figure 21:
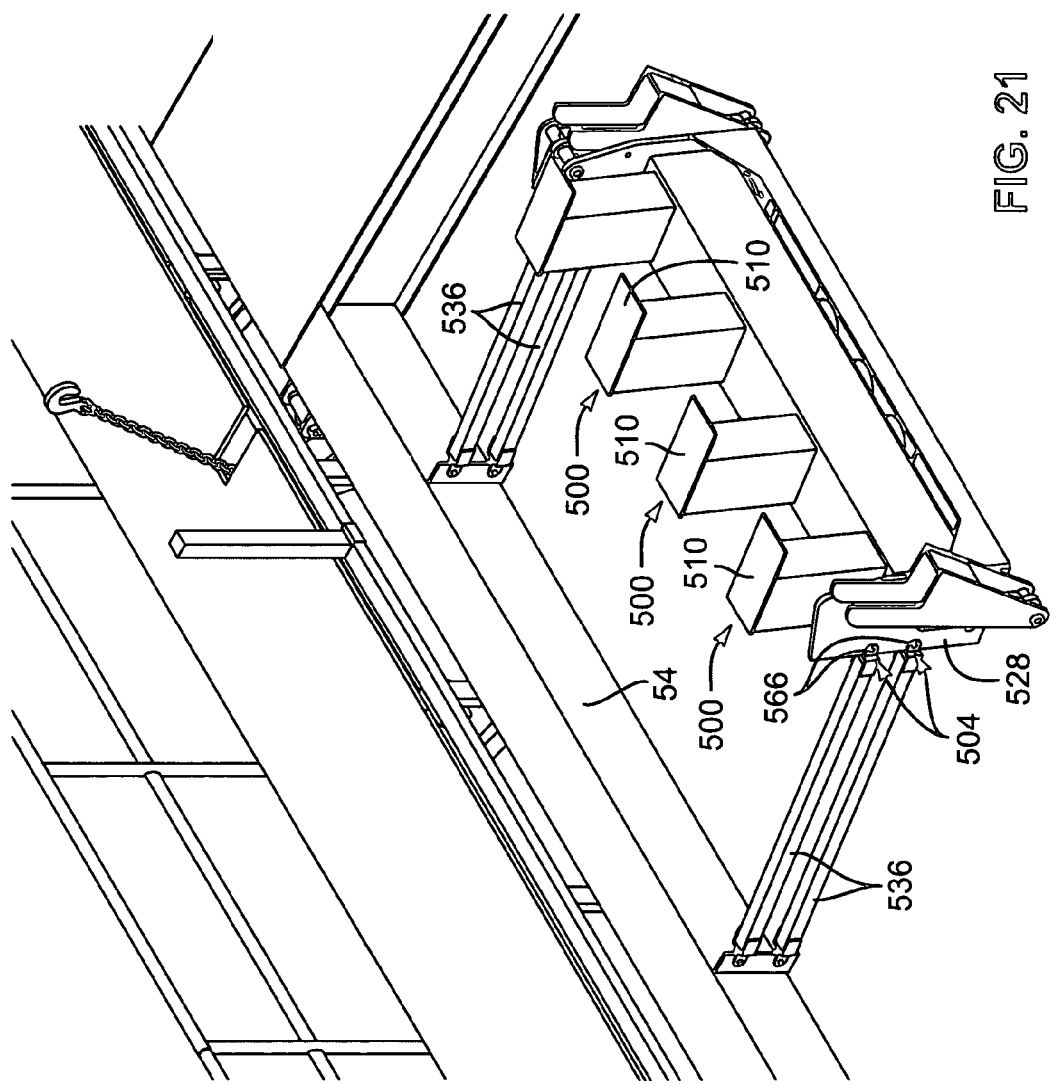
FIG. 21 is cutaway perspective view of an alternative embodiment of an external support in accordance with the invention.

Referring to FIG. 21, an alternative embodiment of a belly support 60 may include two sets of two parallel arms 536 having their ends pivotally secured to the seats 526 by a pivot 564, such as a pin 566 extending through the arms 536 and the seats 526. In such an embodiment, the pads 500 will not rotate as they are raised. Accordingly the pivot 514 connecting the stand offs to the cross beam 524 may be omitted.

Figure 22:
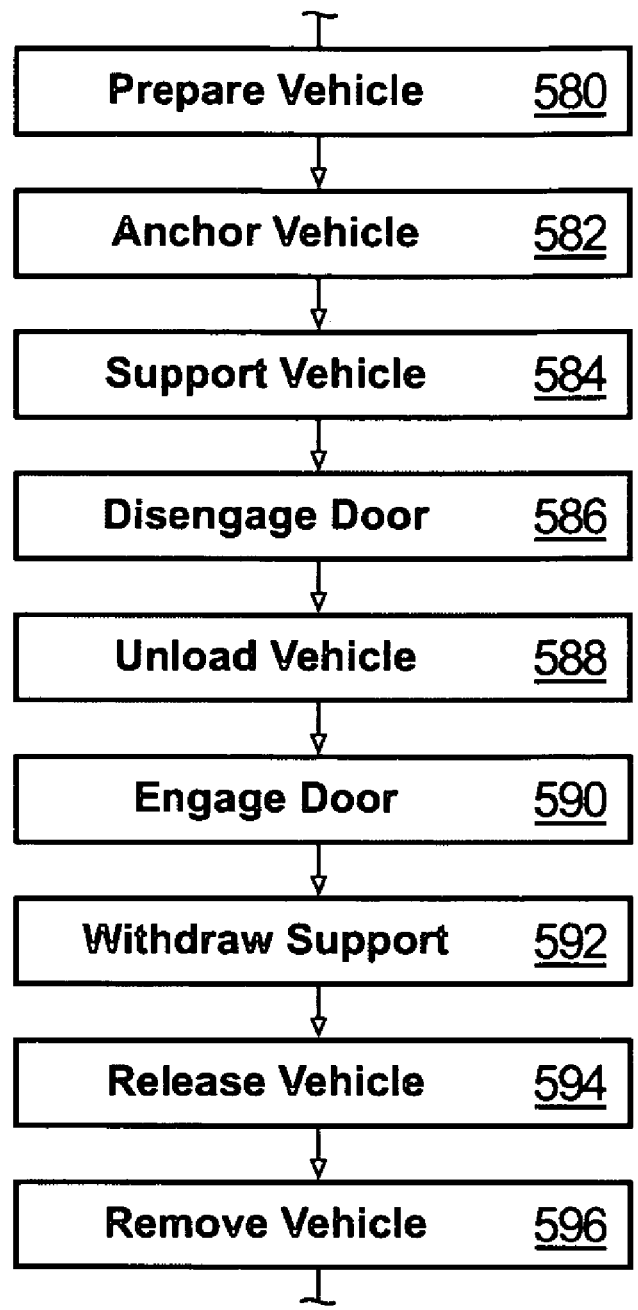
FIG. 22 is a process flow diagram of a method for using a side-dumping trailer and unloading station in accordance with the invention.

An unloading station 12 and trailers 32, 34 may operate using the method of FIG. 22. It will be understood that many of the steps in FIG. 22 may be performed in an order different from that listed or may be performed simultaneously with other steps. Furthermore, each of the steps of FIG. 26 may include various sub-steps likewise performed in varying orders or simultaneously.

A preparing step 580 may include positioning the truck 30 (e.g. tractor, lead truck, etc.) and one or more trailers 32, 34 on the unloading station 12. In some embodiments, the truck 30 may pull the a trailer 32, 34 or trailers 32, 34 onto the unloading station 12, disconnect, and drive off the unloading station 12. In the illustrated embodiment, the truck 30 remains on the unloading station 12. This may save time inasmuch as the truck 30 does not need to be disconnected, driven off, driven back onto the unloading station 12, and reconnected.

Positioning the truck 30 and one or more trailer 32, 34, on the unloading station 12 may include providing a signal indicating that the unloading station 12 is ready. A driver of a truck 30 may also observe the unloading station 12 to verify that it is clear of ice, snow, debris, or other hazards or obstructions. When driving the vehicle onto the unloading station 12 a driver will typically ensure that the wheel guide 56 is rubbing the inside edge of the appropriate tires as the truck 30 drives onto the unloading station 12.

A truck 30 and trailers 32, 34 may be further prepared by deflating air bags normally providing shock absorption in order to stabilize movement. Deflating air bags may allow the truck 30 and trailers 32, 34 to sit more rigidly on the unloading station 12, being less subject to excessive rocking during unloading. During unloading, the engine of the truck 30 is typically shut off and the brakes of the truck 30 and trailers 32, 34 are set. The driver will typically exit the truck 30 during unloading of the trailers 32, 34.

Anchoring 582 a truck 30 and trailers 32, 34 may include securing them to the unloading station 12 such that they do not shift substantially with respect to the deck of the unloading station during unloading. Any anchor system may be used to accomplish this purpose. In one embodiment, a truck 30 may anchor to the unloading station 12 by a comealong 230, or the like, secured substantially permanently to the front of the truck 30 or to the unloading station 12. The comealong 230 may secure to both the truck 30 and unloading station 12 and provide tension. After unloading the cargo, the suspension of the truck 30 will be under less load. Accordingly, the suspension of the truck 30 will cause greater tension in the comealong 230 after the trailers 32, 34 are unloaded. Therefore, the comealong 230 must be tensioned enough to anchor the truck 30, but not so much that it cannot be released and provides sufficient travel to disengage after the trailers 32, 34 are unloaded. In some embodiments, a sensor or mechanical failsafe device will verify that the front of the truck 30 is anchored and prevent unloading if the truck 30 is not properly anchored.

Anchoring 582 the trailers 32, 34 may also include engaging the anchors 62 with the trailers 32, 34. Engaging the anchors 62 may include positioning fasteners 110 within anchor receptacles 274 and activating the tensioning system 114 to apply tension to the line 112.

Anchoring 582 the vehicle may include having an operator walk around the truck 30 and trailers 32, 34 to verify that the anchors 62 and comealong 230 secure the truck 30 and trailers 32, 34 to the unloading station 12. While verifying anchoring, an operator may verify that the air bags of the truck 30 and trailers 32, 34 are properly deflated.

A supporting step 584 may bring an external support into contact with the trailers 32, 34 to bear loads that are supported by the door 36 when closed. In the illustrated embodiment, the supporting step 584 may include directing hydraulic fluid to the cylinder 528 causing the piston 530 to raise the pads 500 into contact with the underside of the lower support member 252a. In some embodiments in accordance with the invention, the tensioning system 114 of the anchors 62 is activated after the supporting step 584. The supporting step 584 may also include having an operator visually verify that the pads 500 are supporting the lower support member 254a. Meters, deflecting indicator, or the like may install to output an indication of proper location and loading during the supporting 584 of the trailers 32, 34.

A disengaging step 586 may include releasing and opening the door 36 such that it no longer supports the floor 246 of the trailer 32, 34. A disengaging step 586 may also include having an operator verify that the doors 36 of both trailers 32, 34 have properly opened.

An unloading step 588 may include tipping the bearing surface 50 such that the contents of the trailers 32, 34 will flow out of the trailers 32, 34 to a hopper, conveyor belt, pit, pile, or the like. In the illustrated embodiment, an unloading step 588 may include activating the lifting actuator 186. During the unloading step 588, an operator may verify that cargo has unloaded successfully. If the cargo has not exited, the agitator 552 may activate to aid in unloading of the cargo. The agitator 552 may be activated repeatedly until the cargo successfully unloads. Once the cargo is removed, the unloading step 588 may include lowering the bearing surface 50 to a horizontal position.

An engaging step 590 may include re-engaging the door 36 with the lower support member 254a such that the door 36 again supports the floor 246. Re-engaging the door 36 may include activating the lifting mechanism 330 to lift the door 36 and activating the locking mechanism 332 to lock the door 36 in position. The engaging step 590 may include having an operator verify that the door 36 has closed. Where the doors 36 do not close properly, an operator may wait until the truck 30 and trailers 32, 34 are driven off the unloading station 12. This may be safer, inasmuch as the doors 36 are typically positioned at the edge of the unloading station 12 over a large drop to a hopper, pit, pile, conveyor belt or the like. Meanwhile, unloaded, the trailers 32, 34 can move, even with doors 36 unlocked.

A withdrawing step 592 may include deactivating the lifting mechanism is supporting the floor 246 of the trailers 32, 34. For example, one may deactivate the hydraulic cylinder 528 and piston 530, allowing the belly support 60 to drop, slide, pull or fall away from the longitudinal support member 254a. A withdrawing step 592 may include having an operator verify that the belly support 60 is positioned flush with the bearing surface 50.

A releasing step 594 may include deactivating the tensioning system 114 of the anchors 62. In some embodiments, lifting and locking the door 36 may take place after the tensioning system 114 is deactivated. The releasing step 594 may also include removing the fasteners 110 from the anchor receptacles 274. In some embodiments, the releasing step 594 may include hanging the fastener 110 on the cable 100 extending along the unloading station 12, or otherwise stowing the fasteners 110 and lines 112. An operator may also release the tension in the comealong 230 and stow the comealong 230 in embodiments having a comealong 230 substantially permanently secured to the front of the truck 30. The releasing step 594 may also include having an operator verify that all anchors are disengaged and stowed properly.

Removing 596 the vehicle may include reinflating airbags in the suspension system of the trailers 32, 34 and the truck 30. Removing 596 may also include verifying that the doors 36 have locked properly. An operator may then drive the truck 30 off of the unloading station 12. After driving off the unloading station 12 an operator may take any special measures needed to close the doors 36, such as clearing jammed pieces of cargo, or the like.

Figure 23:
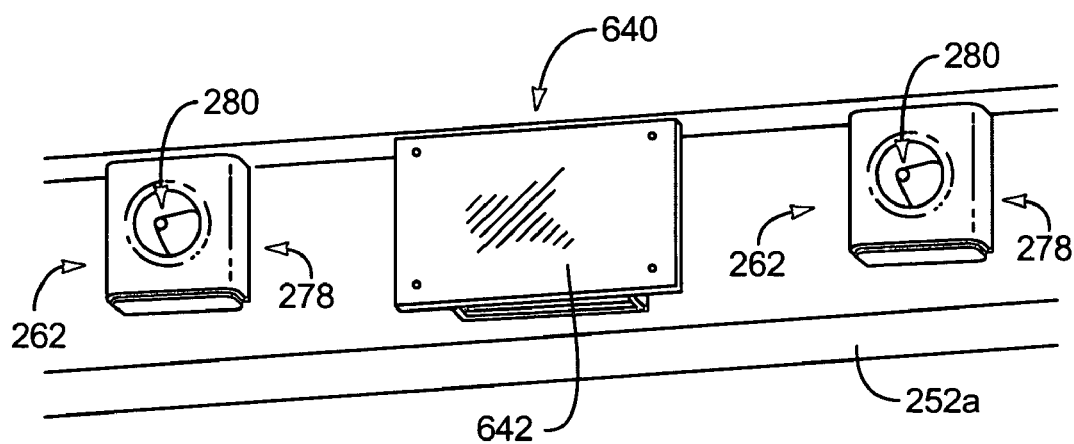
FIG. 23 is a perspective view of an alternative embodiment for a catch and locking mechanism in accordance with the invention.
Figure 24:
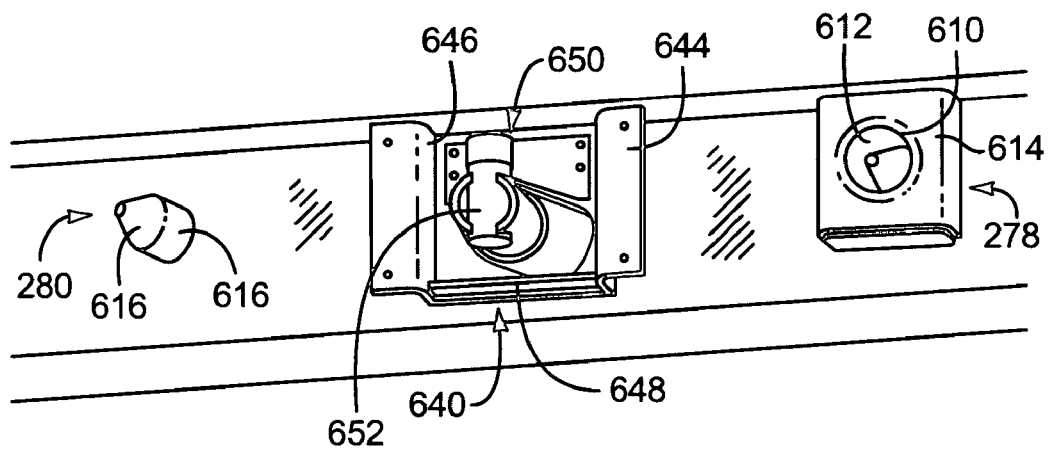
FIG. 24 is a cutaway perspective view of the catch and locking mechanism of FIG. 23.

Referring to FIGS. 23 and 24, in some embodiments, the catch 262 and locking mechanism 332 may both be located near the lower supports 252a, 252b. A catch 262 may include a receptacle 278 secured to the lower edge 314 of the door 36 and a fastener 280 secured to the longitudinal support 252a. The receptacle 278 may be embodied as an aperture 610 formed near the lower edge 314 of the door 36.

In the illustrated embodiment, the aperture 610 is formed as a hollow cylinder 612 secured to the lower edge of the door 36. The cylinder 612 may extend through a support 614 already extant to support other structures or added to support the cylinder 612. The support 614 may be, for example, a hollow structure, such as a section of a box beam, or a bracket extending from the longitudinal support 252a. In some embodiments, the receptacle 278 may be embodied as an aperture 610 formed directly in the door 36 near the lower edge 314 of the door 36 or in a structure extending therefrom.

The fastener 280 may be embodied as a post 616 secured to the longitudinal support 252a. The post 616 may have a conical end 618 in order to facilitate alignment of the post 616 within the aperture 610. Alternatively, in some embodiments, the entire post 616 may be conically shaped, a frustum, tapered to some degree, or otherwise piloted. In some embodiments, rather than a conical end 618, the free end of the posts 616 may simply be chamfered or hemispherically shaped.

Figure 25:
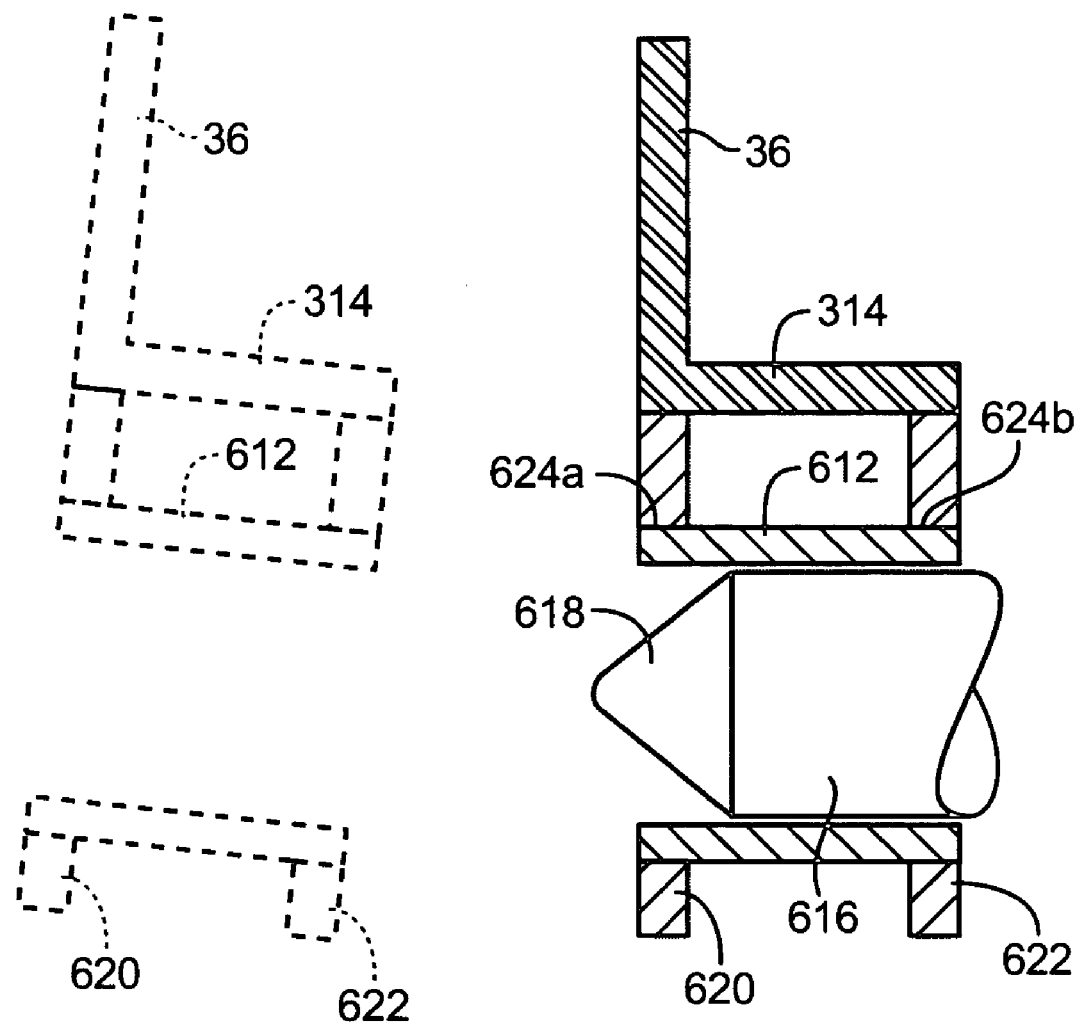
FIG. 25 is a side view of the catch of FIG. 23 in accordance with the invention.

In the embodiment of FIGS. 23 through 25 the receptacle 278 and fastener 280 may be considered to serve the function of registering the lower edge 314 of the door 36 with respect to the lower support 252a. Accordingly, the catch 262 of the embodiment of FIGS. 23 through 25 may be considered to be a registration system and the receptacle 278 may be considered an engagement portion formed in, or secured to the door 36. The fastener 280 may be considered a registration member adapted to engage the engagement portion. Various systems and methods for registering a door or lid with respect to an opening may be used to serve the function of registration. For example, in some embodiments, a registration member may be formed in, or secured to, the door, and the engagement portion formed in or secured to the lower support 252a. For example, a post or spike may secure to the door 36 and insert into an aperture or cavity in the lower support 252a upon closing of the door 36.

Referring to FIG. 25, the support 614 may be embodied as a section of another structure, such as a rail, stringer, or box beam, or like structure. The structure may have an outer wall 620 facing outwardly and an inner wall 622 facing the longitudinal support 252a when the door 36 is closed. The cylinder 612 may extend between the outer wall 620 and inner wall 622 through apertures 624a, 624b formed therein. When the door 36 is in a closed position, the post 616 may be positioned within the cylinder 612. As the trailer 32, 34 is tipped, the lower edge 314 of the door 36 may fall away (move laterally) from the longitudinal support 252a, and the cylinder 612 may disengage from the post 616.

Figure 26:
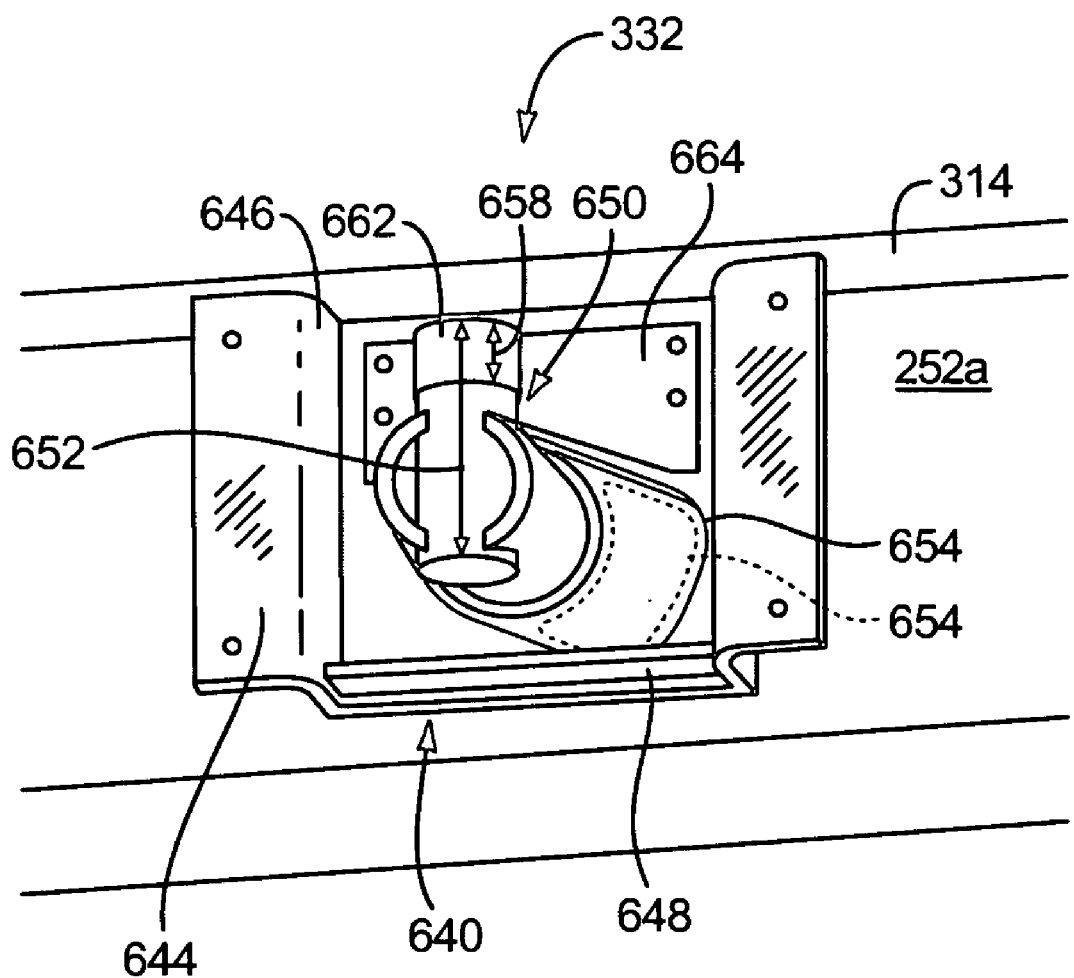
FIG. 26 is a cutaway view of a locking mechanism in accordance with the invention.

Referring to FIG. 26, while still referring to FIG. 23, a locking mechanism 332 may engage a receptacle 640 formed or secured near the lower edge 314 of the door 36. The receptacle 640 may include a cover plate 642 and a bracket 644 forming a channel 646. An end plate 648 may seal one end of the bracket 644 with the other end secured to the lower edge 314 of the door 36 by means of welds, bolts, or other fastening devices. Alternatively, the receptacle may be embodied as a short section of a rail, angle, channel, or box beam or be formed integrally or monolithically with the door 36.

The locking mechanism 332 may include a latch 650 engaging the receptacle 640 to secure the lower edge 314 of the door 36 to the lower support 252a. It will be noted that in the embodiment of FIGS. 23-26 the catch 262 secures the door 36 against movement in approximately the longitudinal direction 18 and vertical direction 20. Accordingly, a locking mechanism 332 for the embodiment of FIGS. 23-26 may secure the door 36 in substantially the lateral direction 22.

The latch 650 may secure the lower edge 314 of the door 36 against lateral movement, position the door laterally during closing of the door, or both. In some embodiments, the latch 650 may be embodied as a post 652 secured to the lower support 252a and positioned to engage the receptacle 640 to hinder or restrain movement of the receptacle 640 relative to the catch 650. In some embodiments, the post 652 may be inserted through an aperture 654 formed in the bracket 644. The orientation or position of the post 652 may then be changed to prevent removal through the aperture 654. For example, the post may be shifted upward, downward, or rotated.

In the illustrated embodiment, a portion 658 of the post 652 is aligned within a region 660 of the aperture 654 prior to locking, such that the post 652 does not interfere with the bracket 644. During locking, the post 652 may be moved such that the portion 658 (e.g. stud, follower) no longer aligns with the region 660 but rather traps a portion of the bracket 644 between the post 652 and the lower support 252a as shown in FIG. 26.

The portion 658 of the post 652 may include a roller 662 to facilitate motion of the post 652 relative to the bracket 644. The roller 662 reduces the substantial friction on the follower 658 or follower portion 658. The post 652 may also engage a wear plate 664 secured to the bracket 644 to resist or bear wear caused by relative movement between the post 652 and the bracket 644.

Referring to FIG. 27, in some embodiments, an actuator 666 may draw the lower edge 314 of the door 36 closer to the lower support 252a to prevent the escape of cargo. For example, a pneumatically or hydraulically actuated member may engage the door 36 near the lower edge 314 to drive the door 36 closer to the lower support 252a. In some embodiments an actuator 666 may also move the post 652 in a lateral direction 20 to draw the lower edge 314 toward the lower support 252a. In some embodiments, the actuator 666 may also position the post 652 to lock or unlock the door 36.

In the illustrated embodiment, for example, the actuator 666 may be embodied as a shaft 668 extending laterally across the trailer 32, 34. The actuator 666 may include a driver 669 powering the rotation of the shaft 668. In the illustrated embodiment, the driver 669 is a handle 670 secured to rotate the shaft 668. In some embodiments, the handle 670 may be positioned on the side of the trailer 32, 34 opposite the door 36. In some embodiments, the driver 669 may be embodied as a pneumatic or hydraulic motor or piston configured to rotate the shaft. The post 652 may likewise secure to the shaft 658 and be rotated thereby into locked and open positions.

In some embodiments, rotation of the shaft 668 may both cause the post 652 to rotate into or out of a locked position and cause the post 652 to move laterally to pull the lower edge 314 of the door 36 toward the lower support 352a or to release the lower edge 314 of the door 36. Alternatively, separate mechanisms may be provided to draw the lower edge 314 toward the lower support 352a and to lock the lower edge 314 in place. For example, the post 652 may rotate without lateral movement to lock the lower edge 314 and a hydraulically actuated hook or other structure may engage a receptacle or like structure near the lower edge 314 to draw the lower edge 314 toward the lower support 352a.

In some embodiments, the actuator 666 may include a guide 672. The guide 672 may engage a follower 674 to cause the shaft 668 to move laterally as the shaft 668 is rotated by the driver 668. In some embodiments, the guide 672 may be formed in, or secured to the shaft 668, and the follower 674 formed in, or secured to, the lower support 252a, or a mount 676 secured to the lower support 252a. In others, the guide 672 may secured to, or be formed in, the lower support 252a or the mount 676, and the follower 674 may be secured to or be formed in the shaft 668.

In the illustrated embodiment, the guide 672 is embodied as a helix 678, slot 678, groove 678, or spirally shaped groove 678, formed in the mount 676. The follower 674 may be embodied as a post 680 secured to the shaft 668. The post 680 may extend into the groove 678 such that the edge of the groove 678 urges the post 680 to move in the lateral direction 20 as the shaft 668 is rotated. In some embodiments, a roller 682 may secure to the post and engage the groove 678 to reduce frictional drag as well as wear on the post 680 and the groove 678.

In some embodiments, a lock 684 may prevent the post 652 from inadvertently moving from a locked position to a closed position. For example, a pin, detent, protrusion, or like device may secure the handle 670 against movement. In some embodiments, an extension 686 may extend from the wall or edge of the groove 678 to restrain the passage of the roller 682 thereover. The force exerted by the load against the door 36 or the restoring force exerted by deformation of the bracket 644, post 642, and shaft 668, may ensure that the roller 682 may not be moved past the extension 686 without the exertion of some minimum amount of force such as would be supplied by applying force to the handle 670.

Figure 28A:
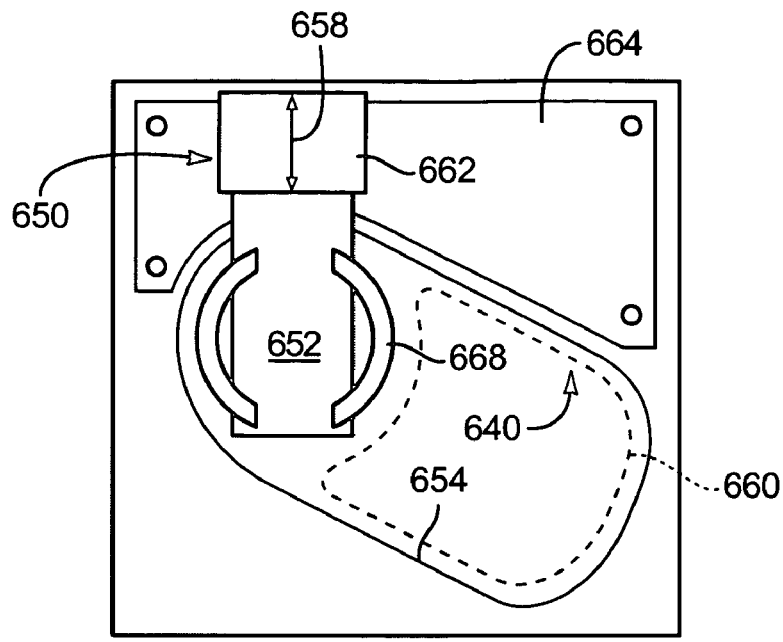
FIG. 28A is a side view of the locking mechanism of FIG. 23 in an open position in accordance with the invention.
Figure 28B:
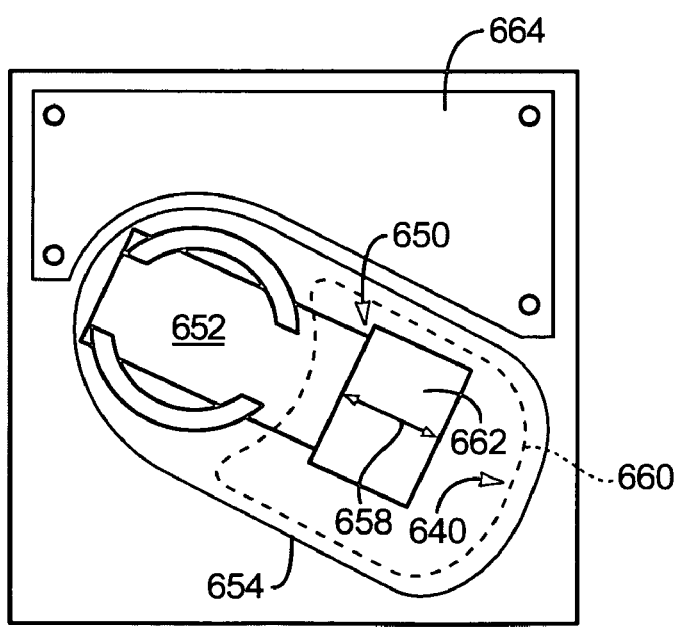
FIG. 28B is a side of view of the locking mechanism of FIG. 23 in a locked position in accordance with the invention.
Figure 29A:
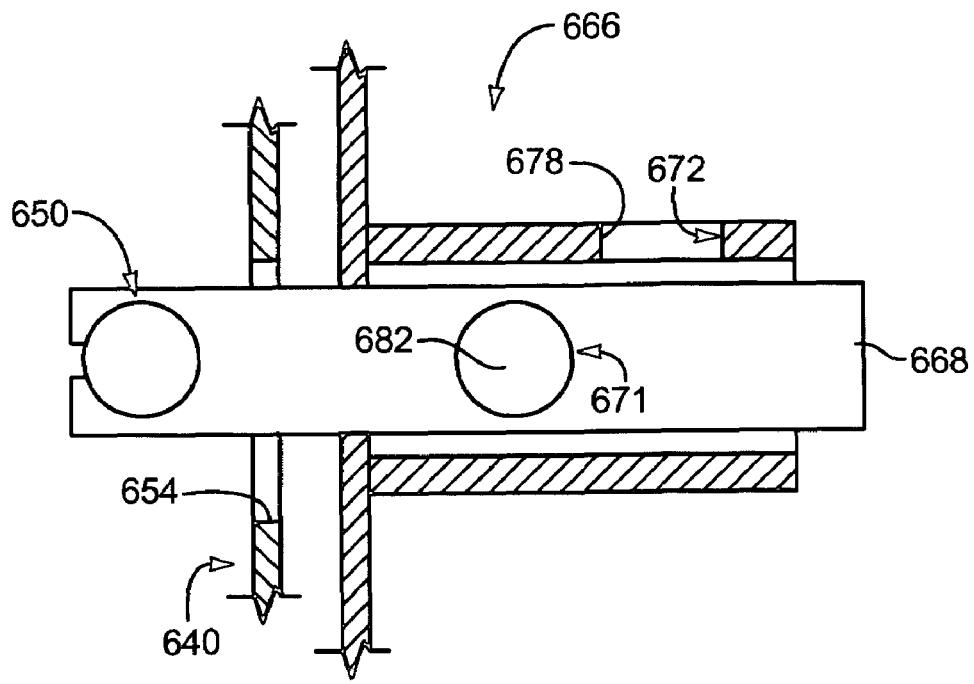
FIG. 29A is a front view of the locking mechanism of FIG. 23 in an open position in accordance with the invention.
Figure 29B:
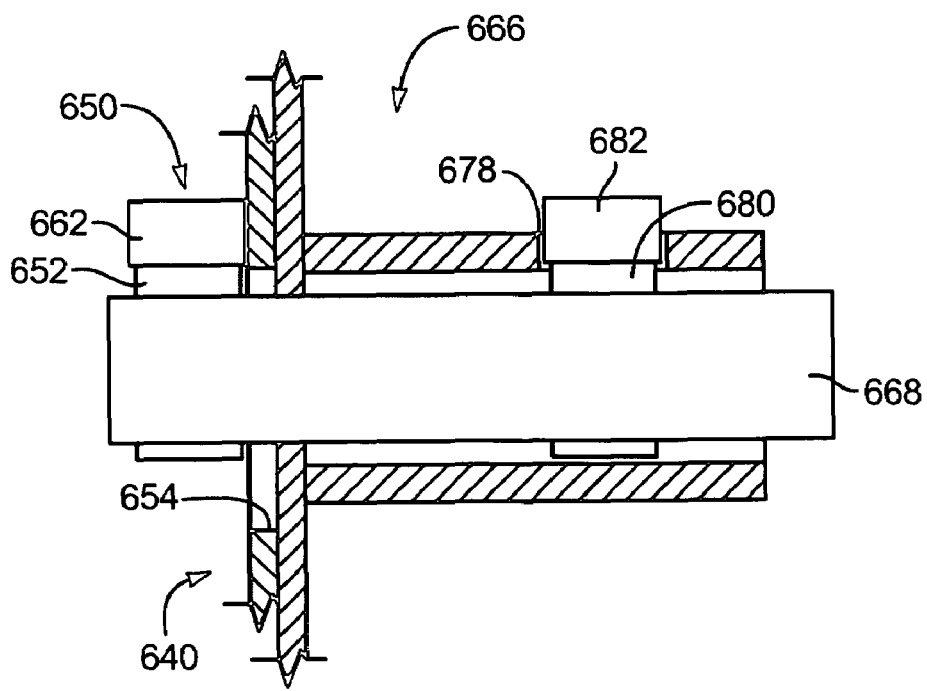
FIG. 29B is a front view of the locking mechanism of FIG. 23 in a locked position in accordance with the invention.

Referring to FIGS. 28A and 28B and FIGS. 29A and 29B, a follower 674 may move between the position of FIGS. 28A and 29A to the position illustrated in FIGS. 28B and 29B. The position of FIGS. 28A and 29A may be considered an open position, with the door 36 able to fall (move laterally) away from the post 652 when the trailers 32, 34 are tipped. The position of FIGS. 28B and 29B may be considered a locked position, with the post 652 engaging the bracket 644 to fix the lateral position of the lower edge 314 of the door 36.

As the post 252 is rotated from the open position to the locked position, the post 680 moves within the groove 678, causing the shaft 256 to shift in the lateral direction. The movement of the shaft 256 causes the post 652 to move the bracket 644 toward the lateral support 252a. Rotation of the shaft 256 also causes the post 252 to move from the position of FIG. 28A, with the portion 658 of the post 652 aligned with the region 660 of the aperture 654, to the position of 28B, with the portion 658 positioned over the bracket 644 such that the bracket 644 cannot move laterally past the post 652.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. A method comprising:
providing a vehicle including a frame, a door hingedly secured to the frame, an extension extending from one of the frame and door, an aperture sized and positioned in the other of the frame and door to receive the extension, and a latch secured to the door and positioned to engage the frame;
closing the door with respect to the frame until misalignment between the extension and the aperture resists further closure;
operating the latch manually to draw the extension into alignment and engagement with the aperture;
loading, after closing the door and operating the latch, the vehicle with cargo having a total weight exceeding the maximum bearing load at failure of the vehicle absent engagement between the extension and the aperture, wherein failure of the vehicle comprises at least one of inelastic deformation of the frame and deflection rendering the latch incapable of drawing the extension into engagement with the aperture;
transporting the vehicle to a location;
supporting, at the location, the frame against at least a portion of the total weight;
opening, after supporting the frame, the door with respect to the frame to provide a cargo exit; and
unloading the cargo from the vehicle through the cargo exit.

2. The method of claim 1, wherein the extension is shaped to pilot itself into the aperture.

3. The method of claim 2, wherein the door comprises substantially an entire side of the vehicle.

4. The method of claim 3, wherein the frame comprises an upper support and a lower support.

5. The method of claim 4, wherein the door hingedly secures to the upper support.

6. The method of claim 5, wherein operating the latch produces a lifting effect on the lower support to draw the extension into alignment and engagement with the aperture.

7. A method comprising:
providing a vehicle including a frame, a door hingedly secured to the frame, an extension extending from one of the frame and door, an aperture sized and positioned in the other of the frame and door to receive the extension, and a latch secured to the door and positioned to engage the frame;
closing the door with respect to the frame;
operating the latch manually to draw the extension into engagement with the aperture;
loading, after operating the latch, the vehicle with cargo having a total weight exceeding the maximum permissible bearing load supportable by the vehicle absent one of inelastic deformation of the frame or engagement between the extension and the aperture;
transporting the vehicle to a location;
supporting, at the location, the frame against a portion of the total weight;
opening, after supporting the frame, the door with respect to the frame to provide a cargo exit; and
unloading the cargo from the vehicle through the cargo exit.

8. A method comprising:
providing a vehicle including a frame, a door hingedly secured to the frame, an extension extending from one of the frame and door, an aperture sized and positioned in the other of the frame and door to receive the extension;
closing the door with respect to the frame;
operating a latch to draw the extension into an engagement with the aperture;
loading, after operating the latch, the vehicle with cargo having weight sufficient, absent the engagement, to cause at least one of deflection rendering the latch incapable of drawing the extension into engagement with the aperture and inelastic deformation of the frame;
transporting the vehicle to a location;
supporting, at the location, the frame against a portion of the weight;
opening, after supporting the frame, the door with respect to the frame; and unloading the cargo from the vehicle.

* * * * *